(12) United States Patent
Minteer et al.

(10) Patent No.: US 7,709,134 B2
(45) Date of Patent: May 4, 2010

(54) MICROFLUIDIC BIOFUEL CELL

(75) Inventors: Shelley D. Minteer, Pacific, MO (US);
Robert S. Martin, St. Louis, MO (US);
Christine M. Moore, St. Louis, MO (US)

(73) Assignee: St. Louis University, St. Louis, MO (US)

( * ) Notice: Subject to any disclaimer, the term of this patent is extended or adjusted under 35 U.S.C. 154(b) by 0 days.

(21) Appl. No.: 10/598,951

(22) PCT Filed: Jan. 19, 2005

(86) PCT No.: PCT/US2005/001827
§ 371 (c)(1),
(2), (4) Date: Jul. 13, 2007

(87) PCT Pub. No.: WO2005/096430
PCT Pub. Date: Oct. 13, 2005

(65) Prior Publication Data
US 2007/0287034 A1 Dec. 13, 2007

Related U.S. Application Data

(60) Provisional application No. 60/553,260, filed on Mar. 15, 2004.

(51) Int. Cl.
*H01M 4/90* (2006.01)
*H01M 4/88* (2006.01)
(52) U.S. Cl. .......................... 429/43; 502/101
(58) Field of Classification Search .............. 429/2, 429/42, 43; 502/101
See application file for complete search history.

(56) References Cited

U.S. PATENT DOCUMENTS

| 4,117,202 | A |   | 9/1978  | Beck              |
|-----------|---|---|---------|-------------------|
| 4,224,125 | A |   | 9/1980  | Nakamura et al.   |
| 4,490,464 | A |   | 12/1984 | Groton et al.     |
| 4,705,503 | A |   | 11/1987 | Dorman et al.     |
| 4,761,209 | A |   | 8/1988  | Bonaventura et al.|
| 5,094,928 | A | * | 3/1992  | Dyer ............... 429/44 X |
| 5,211,984 | A |   | 5/1993  | Wilson            |
| 5,262,035 | A |   | 11/1993 | Gregg et al.      |
| 5,262,305 | A |   | 11/1993 | Heller et al.     |
| 5,264,092 | A |   | 11/1993 | Skotheim et al.   |
| 5,264,105 | A |   | 11/1993 | Gregg et al.      |
| 5,320,725 | A |   | 6/1994  | Gregg et al.      |

(Continued)

FOREIGN PATENT DOCUMENTS

EP         0300082 A     1/1989

(Continued)

OTHER PUBLICATIONS

Supplementary Partial European Search Report, EP 05711717, dated Oct. 5, 2007, 4 pages.

(Continued)

*Primary Examiner*—Stephen J. Kalafut
(74) *Attorney, Agent, or Firm*—Senniger Powers LLP

(57) ABSTRACT

Microfluidic biofuel cells comprising a bioanode and/or a biocathode are formed using microfluidic principles and soft lithography. The enzymes utilized in the redox reactions at the bioanode and/or the biocathode are stabilized in a micellar or inverted micellar structure. The biofuel cell is used to produce high power densities.

23 Claims, 13 Drawing Sheets

U.S. PATENT DOCUMENTS

| | | | |
|---|---|---|---|
| 5,356,786 A | 10/1994 | Heller et al. | |
| 5,393,615 A | 2/1995 | Corey et al. | |
| 5,521,101 A | 5/1996 | Saini et al. | |
| 5,593,852 A | 1/1997 | Heller et al. | |
| 5,665,222 A | 9/1997 | Heller et al. | |
| 5,718,947 A | 2/1998 | Martin et al. | |
| 5,919,583 A | 7/1999 | Grot et al. | |
| 5,958,199 A | 9/1999 | Miyamoto et al. | |
| 6,294,281 B1 | 9/2001 | Heller | |
| 6,294,291 B1 | 9/2001 | Ozaki et al. | |
| 6,387,625 B1 | 5/2002 | Eckhardt et al. | |
| 6,460,733 B2 | 10/2002 | Acker et al. | |
| 6,500,571 B2 | 12/2002 | Liberatore et al. | |
| 6,517,964 B2 * | 2/2003 | Mercuri | 429/42 |
| 6,531,239 B2 | 3/2003 | Heller | |
| 2002/0025456 A1 | 2/2002 | Gieshoff et al. | |
| 2002/0025469 A1 | 2/2002 | Heller | |
| 2002/0122972 A1 * | 9/2002 | Klitsner et al. | 429/42 |
| 2002/0127440 A1 | 9/2002 | Yamamoto et al. | |
| 2003/0027023 A1 | 2/2003 | Dutil et al. | |
| 2003/0039868 A1 | 2/2003 | Liberatore et al. | |
| 2003/0087144 A1 | 5/2003 | Sun et al. | |
| 2003/0148169 A1 | 8/2003 | Wilner et al. | |
| 2003/0164335 A1 | 9/2003 | Grate et al. | |
| 2003/0198858 A1 | 10/2003 | Sun et al. | |
| 2004/0101741 A1 | 5/2004 | Minteer et al. | |
| 2004/0121018 A1 | 6/2004 | Grate et al. | |
| 2004/0217016 A1 | 11/2004 | Khan | |
| 2005/0095466 A1 * | 5/2005 | Minteer et al. | 429/42 X |

FOREIGN PATENT DOCUMENTS

| | | | |
|---|---|---|---|
| WO | WO 90/05910 | A1 | 5/1990 |
| WO | WO 99/38003 | A1 | 7/1999 |
| WO | WO 0022688 | A3 | 4/2000 |
| WO | WO 03106966 | A2 | 12/2003 |
| WO | WO 2004079848 | A | 9/2004 |

OTHER PUBLICATIONS

Blaedel et al. "Study of the Electrochemical Oxidation of Reduced Nicotinamide Adenine Dinucleotide" Analytical Chemistry 47:1337-1338 (1975).

Chen et al. "A minature biofuel cell" Journal of American Chemical Society 123:8630-8631 (2001).D.

Davis et al. "Bioelectrochemical Fuel-Cell and Sensor Based on a Quinoprotein, Alcohol-Dehydrogenase" Enzyme and Microbial Technology, 5:383-388 (1983).

Frebortova et al., "Intramolecular Electron Transport in Quinoprotein Alcohol Dehydrogenase of *Acetobacter methanolicus*: A Redox-titration Study" Biochemica et Biophysica Acta, 1363:24-34 (1998).

Green et al., "Inversion of the Substrate Specificity of Yeast Alcohol Dehydrogenase" Journal of Biological Chemistry, 268:7792-7798 (1993).

Kim et al. "A Miniature Membrane-less Biofuel Cell Operating Under Physiological Conditions at 0.5V" Journal of Electrochemical Society, 150(2):A209-A213 (2003).

Leonida et al. "Co-electropolymerization of a Viologen Oligomer and Lipoamide Dehydrogenase on an Electrode Surface. Application to Cofactor Regeneration" Bioorganic & Medicinal Chemistry Letters, Oxford, GB, 6(4):1663-1666 (1996).

Palmore et al. "A Methanol/Dioxygen Biofuel Cell that Uses NAD+-Dependent Dehydrogenases as Catalysts: Application of an Electro-Enzymic Method to Regenerate Nicotinamide Adenine Dinucleotide at Low Overpotentials" Journal of Electroanalytical Chemistry, 443:155-161 (1998).

Plotkin et al. "Methanol Dehydrogenase Bioelectrochemical Cell and Alcohol Detector" Biotechnology Letters, 3 (4):187-192 (1981).

Schrenk et al., "Effect of Mixture Casting Nafion® with Quaternary Ammonium Bromide Salts on the Ion-Exchange Capacity and Mass Transport in the Membranes" Journal of Membrane Science, 205:3-10 (2002).

Palmore et al., "Microbial and Enzymatic Biofuel Cells" in ACS Symposium Series, 566:271-290 (1994).

Thomas et al. "Effects of Annealing on Mixture-Cast Membranes of Nafion® and Quaternary Ammonium Bromide Salts" Journal of Membrane Science, 213:55-66 (2003).

Worthington, V, "Worthington Alcohol Dehydrogenase" Worthington Enzyme Manual 16:1-22 (1988) http://www.worthington-biochem.com/ADH/default.html.

Yue et al. "Enzymatic Oxidation of C1 Compounds in a Biochemical Fuel Cell" Chemical Engineering Journal, 33B: B69-B77 (1986).

Zhou et al., "The Electrochemical Polymerization of Methylene Green and its Electrocatalysis for the Oxidation of NADH" Analytica Chemica Acta, 329:41-48 (1996).

Gouda, M. D., et al., "Stability Studies on Immobilized Glucose Oxidase Using an Amperometric Biosensor—Effect of Protein Based Stabilizing Agents," Electroanalysis, 2001, pp. 849-855, vol. 13, No. 10.

Ryabova, E. S., et al., "Coordinative Approach to Mediated Electron Transfer: Ruthenium Complexed to Native Glucose Oxidase," Angew. Chem. Int. Ed., 1999, pp. 804-807, vol. 38, No. 6.

Schindler, J. G., et al., "Long-Functioning β-D-Glucose and L-Lactate Biosensors for Continuous Flow-Through Measurements for "Fouling"-Resistant and Selectivity-Optimized Serum- and Hemoanalysis," European Journal of Clinical Chemistry and Clinical Biochemistry, Aug. 1994, pp. 599-608, vol. 32, No. 8 (25 page translation is attached).

* cited by examiner

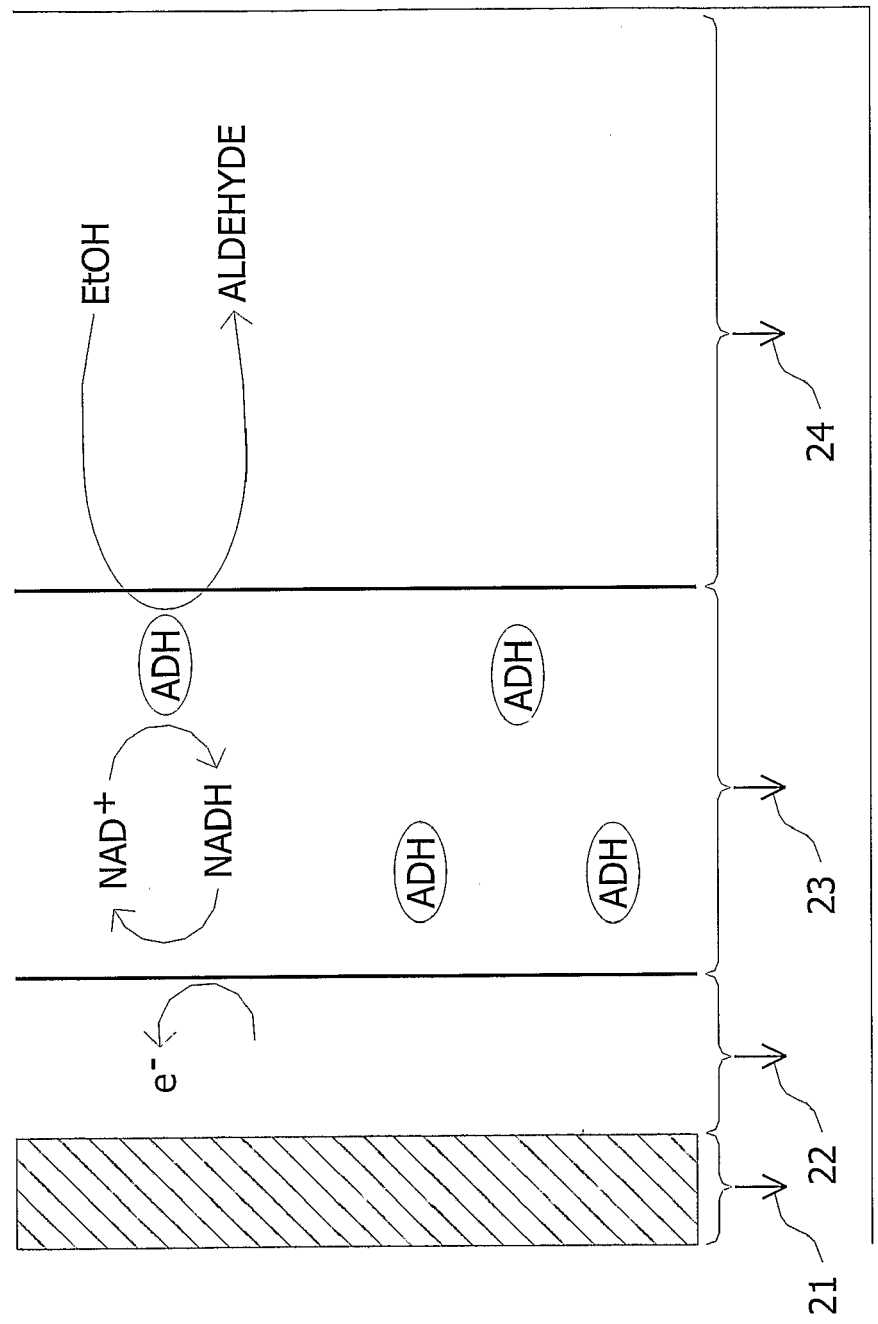

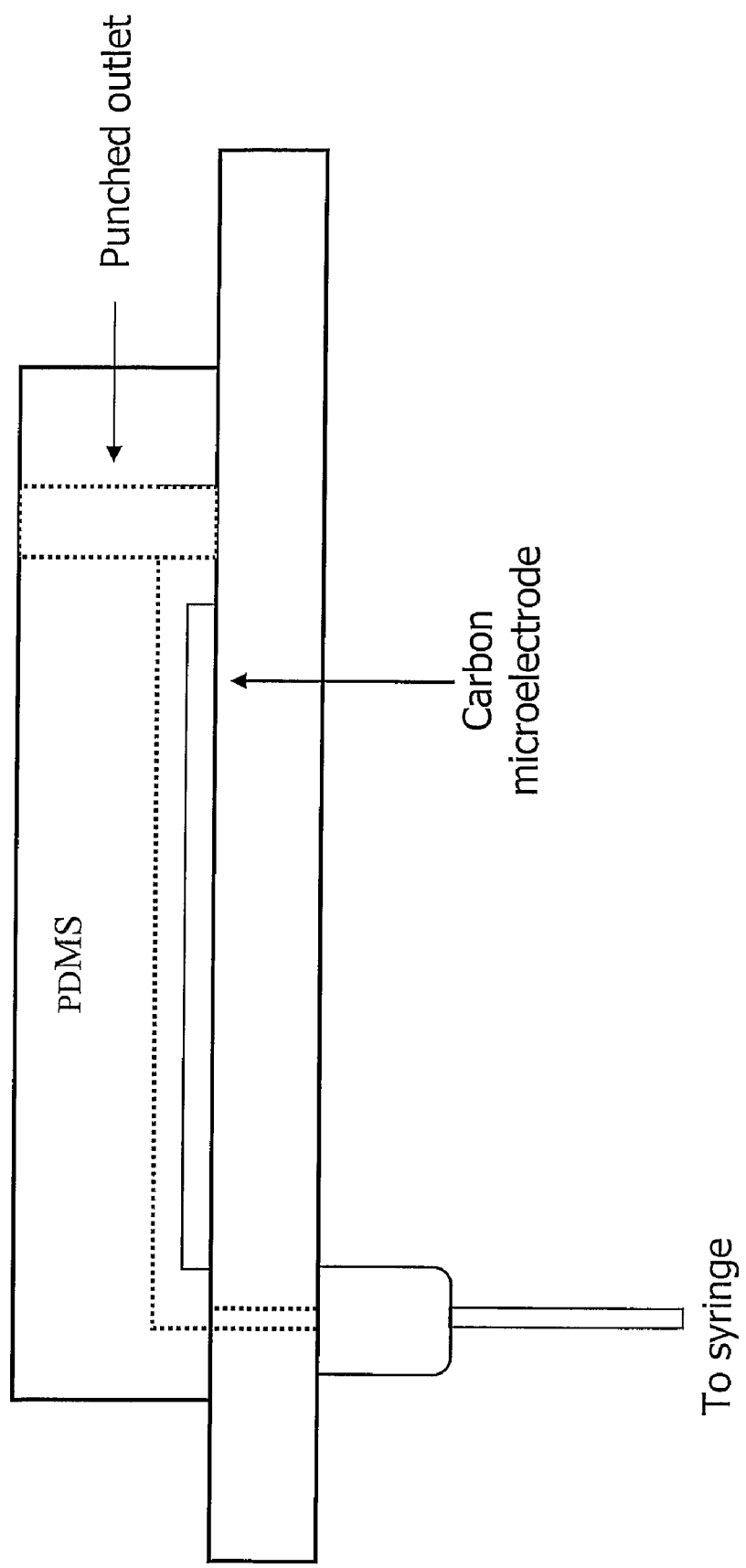

US 7,709,134 B2

MICROFLUIDIC BIOFUEL CELL

CROSS-REFERENCE TO RELATED APPLICATIONS

This application is a 35 U.S.C. §371 application of PCT/US2005/001827, filed on Jan. 19, 2005, which claims the benefit of U.S Provisional Patent Application Ser. No. 60/553,260, filed Mar. 15, 2004. The entire contents of these related applications are hereby incorporated by reference herein.

FIELD OF THE INVENTION

The invention relates generally to fuel cells and methods of generating electricity. The invention relates specifically to the use of microfluidic principles combined with microelectrodes for use in a biofuel cell, and methods of making the microelectrodes and the biofuel cells.

BACKGROUND OF THE INVENTION

A biofuel cell is similar to a traditional polymer electrolyte membrane ("PEM") fuel cell in that it consists of a cathode and anode generally separated by some sort of barrier or salt bridge, such as a polymer electrolyte membrane. However, biofuel cells differ from the traditional fuel cell by the material used to catalyze the electrochemical reaction. Rather than using precious metals as catalysts, biofuel cells rely on biological molecules such as enzymes to carry out the reaction. Early biofuel cell technology employed metabolic pathways of whole microorganisms, an approach which provided impractical power density outputs due to low volumetric catalytic activity of the whole organism. Enzyme isolation techniques spurred advancement in biofuel cell applications by increasing volumetric activity and catalytic capacity. Isolated enzyme biofuel cells yield increased power density output by overcoming interferences associated with cellular membrane impedance with electron transfer and lack of fuel consuming microbial growth.

Although enzymes are highly efficient catalysts, there have been problems incorporating them into fuel cells. Early enzyme-based fuel cells contained enzymes in solution rather than immobilized on the electrode surface. Enzymes in solutions are only stable for days, whereas immobilized enzymes can be stable for months. One of the main obstacles of enzyme-based biofuel cells has been to immobilize the enzyme in a membrane at the electrode surface that will extend the lifetime of the enzyme and form a mechanically and chemically stable layer, while not forming a capacitive region at the electrode surface. In most $H_2/O_2$ fuel cells, the binder that holds the catalyst at the electrode surface is Nafion®. Nafion® is an enzyme immobilization material that has excellent properties as an ion conductor. However, Nafion® has not been successful at immobilizing enzymes at the surface of biofuel cell electrodes because Nafion® forms an acidic membrane that decreases the lifetime and activity of the enzyme.

In addition to these challenges, there is also a desire to reduce the geometric scale of biofuel cells. Along these lines, biofuel cells to date have relied on some sort of physical barrier to separate the anode and cathode, but there is a persistent desire to construct a biofuel cell without such materials to reduce the size of the fuel cell. Such a development would advantageously allow for smaller biofuel cells, reduce raw material costs, simplify the method of construction, and eliminate problems due to fouling or damage of the electrode. In addition to barriers, the size of biofuel cells is limited by the method of forming the electrodes. Currently, electrodes are formed using carbon cloth or carbon paper with typical dimensions of 100 μm thick and 1 mm wide. U.S. patent application Ser. No. 10/617,452 describes such electrodes. A method of producing smaller electrodes would allow for the use of biofuel cells in a variety of micro scale applications.

A further challenge to improving biofuel cell performance is developing ways to increase biofuel cell power density. Currently, the biofuel cell's current density is limited by the diffusion of the fuel fluid to the electrode surface. It would be desirable to improve the biofuel cell's current density by increasing the transport efficiency of the electrodes. Since power is equivalent to the current density multiplied by the voltage, an increase in the biofuel cell's current density will yield a significant increase in the overall power density.

Further, another major problem with biofuel cell development has been the ability to easily form fuel cell stacks. A fuel cell stack is several individual fuel cells that are wired in series to increase the overall voltage of the cell. Particularly, conventional fuel cell stacks are limited dimensionally because of the need for bipolar plates to separate the individual fuel cells. This has made it impossible to meet the space constraints of micro applications. The ability to form fuel cell stacks with micro-dimensions would yield greater power density from smaller sources for various micro-scale applications.

Finally, the inability to form complex or irregularly shaped electrodes has hindered biofuel cell development. Traditional electrode formation techniques using the previously mentioned traditional electrode materials produce an electrode with flat topography. Since current capability is proportional to the electrode's surface area, a flat electrode yields the minimum current capability for given length and width dimensions. If there existed a method of producing electrodes with an irregular topography, however, higher current capabilities could be achieved as compared to similarly sized electrodes produced by conventional techniques.

With the above concerns and challenges in mind, a microfabricated fluidic approach is a possible way to develop a biofuel cell that will address each shortcoming of the current state of biofuel cell technology.

SUMMARY OF THE INVENTION

Among the several aspects of the invention is to provide a method for forming a microfluidic biofuel cell for generating electricity using a fuel fluid comprising a substrate, a cathode supported by the substrate and capable of a reaction to reduce an oxidant in the presence of electrons to form water, an anode supported by the substrate and capable of a reaction to oxidize the fuel fluid, at least one of the anode and cathode including an enzyme for use in carrying out its respective reaction, at least one of the anode and cathode being formed for flow of the fuel fluid therewithin for use in producing an electrical current.

Another aspect is a biofuel cell where the anode comprises an electron conductor, an electron mediator, the reduced form of the electron mediator being capable of releasing electrons to the electron conductor, at least one enzyme capable of reacting with the oxidized form of the electron mediator and the fuel fluid to produce an oxidized form of the fuel fluid and a reduced form of the electron mediator, an enzyme immobilization material capable of immobilizing and stabilizing the enzyme, the material being permeable to the fuel fluid and the electron mediator.

Yet another aspect is a biofuel cell where the anode comprises an electron conductor, at least one enzyme capable of reacting with an oxidized form of an electron mediator and the fuel fluid to produce an oxidized form of the fuel fluid and a reduced form of the electron mediator, the reduced form of the electron mediator being capable of releasing electrons to the electron conductor, and an enzyme immobilization material comprising the electron mediator, the enzyme immobilization material being capable of immobilizing and stabilizing the enzyme, the material being permeable to the fuel fluid.

An additional aspect is a biofuel cell where the anode comprises an electron conductor, an electron mediator, at least one enzyme capable of reacting with the oxidized form of the electron mediator and the fuel fluid to produce an oxidized form of the fuel fluid and a reduced form of the electron mediator, an enzyme immobilization material capable of immobilizing and stabilizing the enzyme, the material being permeable to the fuel fluid and the electron mediator, and an electrocatalyst adjacent the electron conductor, an oxidized form of the electrocatalyst being capable of reacting with the reduced form of the electron mediator to produce an oxidized form of the electron mediator and a reduced form of the electrocatalyst, the reduced form of the electrocatalyst being capable of releasing electrons to the electron conductor.

Yet another aspect is a biofuel cell where the anode comprises an electron conductor, at least one enzyme capable of reacting with an oxidized form of an electron mediator and the fuel fluid to produce an oxidized form of the fuel fluid and a reduced form of the electron mediator, an enzyme immobilization material comprising the electron mediator, the enzyme immobilization material being capable of immobilizing and stabilizing the enzyme, the material being permeable to the fuel fluid, and an electrocatalyst adjacent the electron conductor, an oxidized form of the electrocatalyst being capable of reacting with the reduced form of the electron mediator to produce an oxidized form of the electron mediator and a reduced form of the electrocatalyst, the reduced form of the electrocatalyst being capable of releasing electrons to the electron conductor.

A further aspect is a biofuel cell where the cathode comprises an electron conductor, at least one enzyme capable of reacting with a reduced form of an electron mediator and an oxidant to produce an oxidized form of the electron mediator and water, and an enzyme immobilization material comprising the electron mediator and an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst.

Another aspect is a biofuel cell where the cathode comprises an electron conductor, at least one enzyme capable of reacting with a reduced form of an electron mediator and an oxidant to produce an oxidized form of the electron mediator and water, and an enzyme immobilization material comprising an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst which is capable of reacting with an oxidized form of the electron mediator to produce a reduced form of the electron mediator and an oxidized form of the electrocatalyst.

Yet another aspect is a biofuel cell where the cathode comprises an electron conductor, at least one enzyme capable of reacting with a reduced form of an electron mediator and an oxidant to produce an oxidized form of the electron mediator and water, and an enzyme immobilization material, the enzyme immobilization material being capable of immobilizing and stabilizing the enzyme, the material being permeable to the oxidant, an oxidized form of the electron mediator being capable of gaining electrons from the electron conductor to produce a reduced form of the electron mediator.

Still another aspect is a biofuel cell where the cathode comprises an electron conductor, at least one enzyme capable of reacting with a reduced form of an electron mediator and an oxidant to produce an oxidized form of the electron mediator and water, and an enzyme immobilization material comprising the electron mediator, the enzyme immobilization material being capable of immobilizing and stabilizing the enzyme, the material being permeable to the oxidant, an oxidized form of the electron mediator being capable of gaining electrons from the electron conductor to produce a reduced form of the electron mediator.

Yet another aspect is a biofuel cell for generating electricity using a fuel fluid comprising a substrate, a cathode supported by the substrate and capable of a reaction to reduce an oxidant in the presence of electrons to form water, an anode supported by the substrate and capable of a reaction to oxidize the fuel fluid, at least one of the anode and cathode including an enzyme for use in carrying out its respective reaction, the cathode comprising an enzyme immobilization material comprising a micellar or inverted micellar structure.

A further aspect is a biofuel cell for generating electricity using a fuel fluid comprising a substrate, a cathode supported by the substrate and capable of a reaction to reduce an oxidant in the presence of electrons to form water, an anode supported by the substrate and capable of a reaction to oxidize the fuel fluid, at least one of the anode and cathode including an enzyme for use in carrying out its respective reaction, at least one of the anode and cathode comprising a width less than about 1 mm and at least one surface having an irregular, three dimensional topography capable of inducing convective flow of the fuel fluid over said surface.

An additional aspect is a biofuel cell for generating electricity using a fuel fluid comprising a substrate, a cathode supported by the substrate and capable of a reaction to reduce an oxidant in the presence of electrons to form water, wherein the cathode comprises, (a) an electron conductor, (b) at least one enzyme capable of reacting with a reduced form of an electron mediator and an oxidant to produce an oxidized form of the electron mediator and water, and (c) an enzyme immobilization material comprising the electron mediator and an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst; and the biofuel cell also comprises an anode supported by the substrate and capable of a reaction to oxidize the fuel fluid, wherein the anode comprises (a) an electron conductor, (b) at least one enzyme capable of reacting with an oxidized form of an electron mediator and the fuel fluid to produce an oxidized form of the fuel fluid and a reduced form of the electron mediator, (c) an enzyme immobilization material comprising the electron mediator, the enzyme immobilization material being capable of immobilizing and stabilizing the enzyme, the material being permeable to the oxidant, and (d) an electrocatalyst adjacent the electron conductor, an oxidized form of the electrocatalyst being capable of reacting with the reduced form of the electron mediator to produce an oxidized form of the electron mediator and a reduced form of the electrocatalyst, the reduced form of the electrocatalyst being capable of releasing electrons to the electron conductor; and also where at least one of the anode and cathode being formed for flow of the fuel fluid therewithin for use in producing an electrical current; and also where at least one of the anode's and cathode's enzyme immobilization material comprising a micellar or inverted micellar structure; and also where at least one of the anode and cathode having a width less than about 1 mm.

Another aspect is an electrode for use in a biofuel cell comprising an electron conductor having a width less than about 1 mm and at least one surface having an irregular, three dimensional topography capable of inducing convective flow of the fuel fluid over said surface.

A final aspect is a method for forming an electrode for use in a biofuel cell comprising forming at least one electrical connector on a substrate, forming at least one microchannel in a casting mold comprised of a material that will not passivate the electrode and can be reversibly sealed to the substrate, adhering the casting mold to the substrate, flowing an electron conductor solution through the microchannels, and curing the electron conductor solution to form the electrode.

Other aspects and features of the invention will be in part apparent, and in part described hereafter.

BRIEF DESCRIPTION OF THE DRAWINGS

FIG. 2 is a schematic of the oxidation of ethanol to aldehyde as catalyzed by $NAD^+$-dependent alcohol dehydrogenase (ADH). NADH is electrolyzed at a poly(methylene green)-modified bioanode.

FIG. 9 is a schematic of a carbon ink microelectrode sealed in a PDMS channel with access to flow through a syringe from one end and an outlet in PDMS at the other end.

DETAILED DESCRIPTION OF THE PREFERRED EMBODIMENTS

Figure 1:
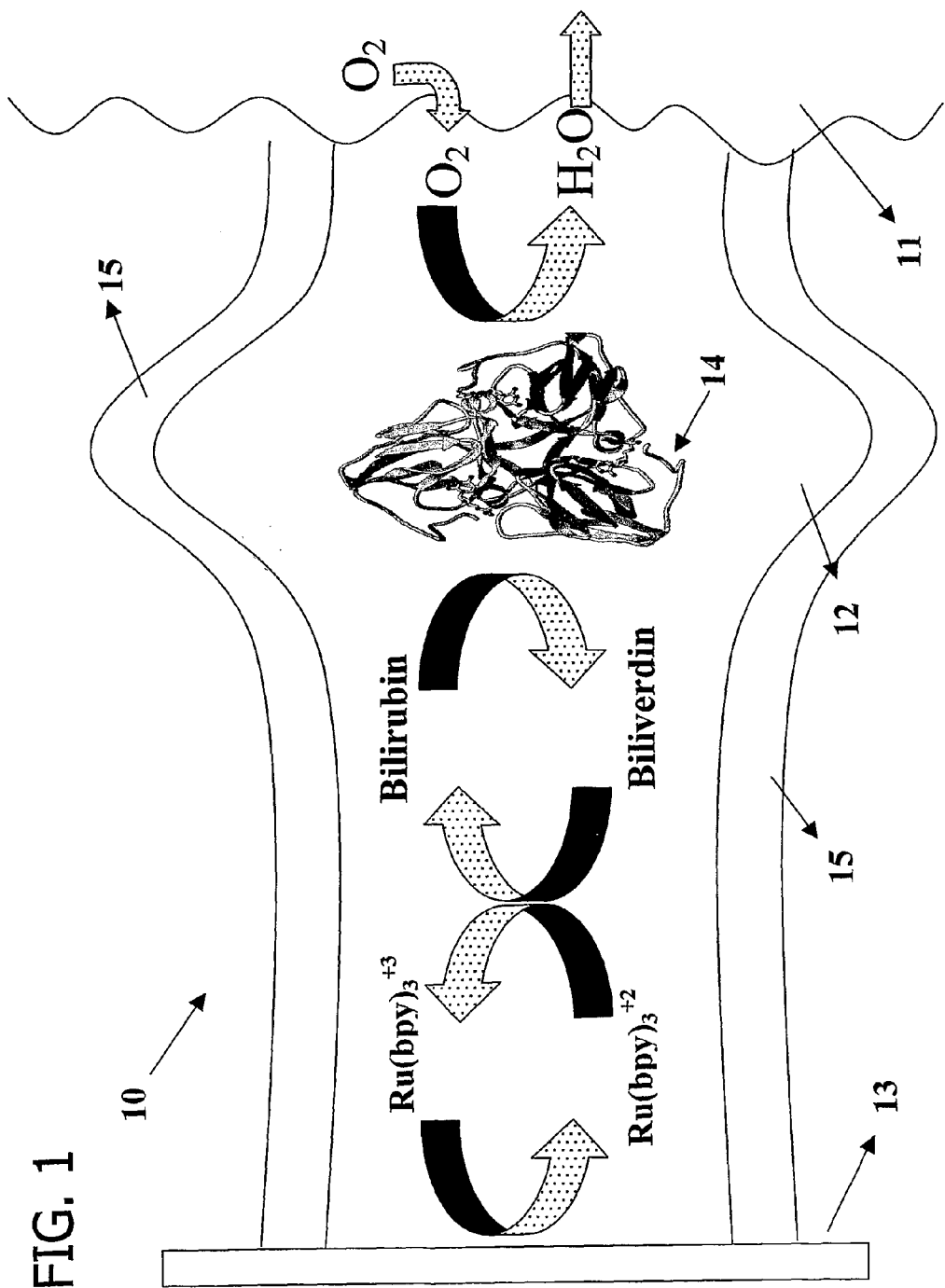
FIG. 1 is a schematic of the reduction of $Ru(bipyridine)_3^{+2}$ to water as catalyzed by bilirubin oxidase. Bilirubin is electrolyzed in enzyme immobilization material at a biocathode.

The present invention of a microfluidic biofuel cell involves a fuel cell that utilizes organic fuels (e.g., a fuel fluid comprising hydrogen, ammonia, a hydrocarbon, alcohol, acid, or aldehyde) to produce electricity via enzyme-mediated redox (oxidation/reduction) reactions, which take place at micromolded bioanodes and biocathodes (collectively referred to herein as microelectrodes). See FIGS. 1 and 2. The bioanode and biocathode both comprise an enzyme immobilization material that is permeable to the fuel fluid or oxidant, respectively, and which serves to immobilize and stabilize their respective enzymes. The immobilization material forms a barrier that provides mechanical and chemical stability to the enzyme in the microelectrodes, serving to stabilize the enzymes of the biofuel cell for a longer period than previously capable. For purposes of the present invention, an enzyme is "stabilized" if it retains at least about 75% of its initial catalytic activity for at least about 30 days to about 730 days. By immobilizing the enzymes at both the bioanode and the biocathode, the present invention negates the requirement for a physical barrier to separate the microelectrodes.

Another aspect of the present invention is the fabrication of the microelectrodes used in the microfluidic biofuel cell. One of the primary advantages of the invention is the use of microfluidic principles to allow for the construction of a complete biofuel cell, including a fuel reservoir and electronic connectors, on a single chip. Additionally, in an embodiment of this invention where fuel is pumped to the microelectrode's surface, the mass transport efficiency of the fuel cell is maximized as compared to conventional fuel cells by combining the existing diffusional transport with convective transport. By increasing the mass transport efficiency, the invention yields a fuel cell with greater current density than known biofuel cells. The invention also increases the current density of biofuel cells by using photolithographic techniques to fabricate microelectrodes with irregular topography. Such a topography advantageously increases the current density of the microelectrode by increasing its surface area in contact with the fuel fluid.

Further, in one embodiment of this invention, a microfabrication approach is used to develop a compact fuel cell stack, which comprises multiple microfluidic biofuel cells. In addition, the microfluidic fuel cell according to this invention increases transport efficiency of an individual fuel cell, which in turn increases current density compared to previous bioanodes and biocathodes.

I. Microfluidic Biofuel Cell

Among the various aspects of the invention is a microfluidic biofuel cell utilizing a fuel fluid to produce electricity via enzyme mediated redox reactions taking place at micromolded microelectrodes with immobilized enzymes therein. As in a standard biofuel cell, the bioanode is the site for an oxidation reaction of a fuel fluid with a concurrent release of electrons. The electrons are directed from the bioanode through an electrical connector to some power consuming device. The electrons move through the device to another electrical connector, which transports the electrons to the biofuel cell's biocathode where the electrons are used to reduce an oxidant to produce water. In this manner, the biofuel cell of the present invention acts as an energy source (electricity) for an electrical load external thereto. To facilitate the fuel fluid's redox reactions, the microelectrodes comprise an electron conductor, an electron mediator, an electrocatalyst for the electron mediator, an enzyme, and an enzyme immobilization material.

Unlike a standard biofuel cell, however, the biofuel cell of the invention utilizes at least one micromolded electrode. In one embodiment, the micromolded electrode has a flow through structure that allows fuel to flow within the microelectrode. When compared to conventional biofuel cell electrodes, this structure yields a higher current density because of the higher amount of microelectrode surface area in contact with the fuel. In another embodiment, the micromolded electrode has an irregular topography. Again, the current density of the microelectrode is greater than conventional biofuel cell electrodes because of a higher amount of surface area in contact with the fuel. These features combine with other features disclosed herein to create a biofuel cell with increased current density over conventional biofuel cells from a dimensionally smaller source. Finally, the method of the current invention can advantageously be used to economically produce disposable fuel cells.

In accordance with the invention, the electron mediator is a compound that can accept electrons or donate electrons. At the bioanode, the oxidized form of the electron mediator reacts with the fuel fluid and the enzyme to produce the oxidized form of the fuel fluid and the reduced form of the electron mediator. Subsequently or concurrently, the reduced form of the electron mediator reacts with the oxidized form of the electrocatalyst to produce the oxidized form of the electron mediator and the reduced form of the electrocatalyst. The reduced form of the electrocatalyst is then oxidized at the bioanode and produces electrons to generate electricity. The redox reactions at the bioanode, except the oxidation of the fuel fluid, can be reversible, so the enzyme, electron mediator and electrocatalyst are not consumed. Optionally, these redox reactions can be irreversible if an electron mediator and/or an electrocatalyst is added to provide additional reactant.

Alternatively, an electron conductor and an enzyme can be used wherein an electron mediator in contact with the bioanode is able to transfer electrons between its oxidized and reduced forms at unmodified microelectrodes. If the electron mediator is able to transfer electrons between its oxidized and reduced forms at an unmodified bioanode, the subsequent reaction between the electrocatalyst and the electron mediator is not necessary and the electron mediator itself is oxidized at the bioanode to produce electrons and thus, electricity.

At the biocathode, electrons originating from the bioanode flow into the biocathode's electron conductor. There, the electrons combine with an oxidized form of an electrocatalyst, which is in contact with the electron conductor. This reaction produces a reduced form of the electrocatalyst, which in turn reacts with an oxidized form of an electron mediator to produce a reduced form of the electron mediator and an oxidized form of the electrocatalyst. Next, the reduced form of the electron mediator reacts with an oxidized form of the oxidant to produce an oxidized form of the electron mediator and water. In one embodiment, an enzyme immobilization material permeable to the oxidant is present, which comprises the electrocatalyst and, optionally, the electron mediator, and which is capable of immobilizing and stabilizing the enzyme.

In an alternative embodiment of the biocathode, there is no electrocatalyst present. In this embodiment, the electrons combine with an oxidized form of the electron mediator to produce a reduced form of the electron mediator. Then, the reduced form of the electron mediator reacts with an oxidized form of an oxidant to produce an oxidized form of the electron mediator and water. In one embodiment, an enzyme immobilization material permeable to the oxidant is present, which optionally comprises the electron mediator, and which is capable of immobilizing and stabilizing the enzyme.

The biofuel cell of the present invention comprises a bioanode and/or a biocathode. Generally, the bioanode comprises elements that effect the oxidation of fuel fluid whereby electrons are released and directed to an external electrical load. The resulting electrical current powers the electrical load, with electrons being subsequently directed to a biocathode where an oxidant is reduced and water is produced. The details of the biofuel cell's components and their fabrication is detailed infra at II.

A. Bioanode

In one embodiment, the bioanode comprises an electron conductor and an enzyme which is immobilized in an enzyme immobilization material. In another embodiment, the bioanode optionally further comprises an electrocatalyst for an electron mediator. An electrocatalyst can be absent from the bioanode when the bioanode contacts an electron mediator that is capable of undergoing a reversible redox reaction at the electron conductor. The above-identified components of the bioanode are adjacent to one another; meaning they are physically or chemically connected by appropriate means.

1. Electron Conductor

The electron conductor is a substance that conducts electrons. The electron conductor can be organic or inorganic in nature as long as it (1) is able to conduct electrons through the material, (2) has high surface area, and (3) can be dispersed as small particulate. The electron conductor can be a carbon-based material, a metallic conductor, a semiconductor, a metal oxide, or a modified conductor. In the preferred embodiment, the electron conductor is formed from a carbon-based ink.

Particularly suitable electron conductors are carbon-based materials. Exemplary carbon-based materials are carbon black (Vulcan XC-72, E-tek), carbon powder, carbon fiber, diamond-coated conductors, graphite, uncompressed graphite worms, delaminated purified flake graphite (Superior® graphite), high performance graphite and carbon powders (Formula BT™, Superior® graphite), platinized carbon, gold-coated carbon, and any carbon-based ink (e.g., Ercon E-978(I)).

In a further embodiment, the electron conductor can be made of a colloidal metallic conductor. Suitable electron conductors can be prepared from gold, platinum, iron, nickel, copper, silver, stainless steel, mercury, tungsten, and other metals suitable for colloidal dispersion. In addition, electron conductors which are metallic conductors can be constructed of nanoparticles made of cobalt, carbon, and other suitable metals.

In addition, the electron conductor can be a colloidal semiconductor. Suitable semiconductor materials include silicon and germanium, which can be doped with other elements. The semiconductors can be doped with phosphorus, boron, gallium, arsenic, indium or antimony, or a combination thereof.

Other electron conductors can be metal oxides, metal sulfides, main group compounds (i.e., transition metal compounds), and materials modified with electron conductors. Exemplary electron conductors of this type are nanoporous titanium oxide, cerium oxide particles, molybdenum sulfide, boron nitride nanotubes, aerogels modified with a conductive material such as carbon, solgels modified with conductive material such as carbon, ruthenium carbon aerogels, and mesoporous silicas modified with a conductive material such as carbon.

2. Electron Mediators

The electron mediator is a compound that can accept or donate electron(s). Stated another way, the electron mediator has an oxidized form that can accept electron(s) to form the reduced form, wherein the reduced form can also donate electron(s) to produce the oxidized form. The electron mediator is a compound that can diffuse into the immobilization material and/or be incorporated into the immobilization material.

In one embodiment, the diffusion coefficient of the electron mediator is maximized. Stated another way, mass transport of the reduced form of the electron mediator is as fast as possible. A fast mass transport of the electron mediator allows for a greater current and power density of the biofuel cell in which it is employed.

Exemplary electron mediators are nicotinamide adenine dinucleotide ($NAD^+$), flavin adenine dinucleotide (FAD), nicotinamide adenine dinucleotide phosphate (NADP), or pyrroloquinoline quinone (PQQ), or equivalents of each. Other exemplary electron mediators are phenazine methosulfate, dichlorophenol indophenol, short chain ubiquinones, potassium ferricyanide, a protein, a metalloprotein, and stellacyanin. In one preferred embodiment, the electron mediator at the bioanode is $NAD^+$.

In one embodiment, the electron mediator cannot undergo a redox reaction at the electron conductor by itself. Here, the bioanode comprises an electrocatalyst for an electron mediator which facilitates the release of electrons at the electron conductor. In another embodiment, a reversible redox couple that has a standard reduction potential of $0.0V\pm0.5$ V is used as the electron mediator. Accordingly, an electron mediator that provides reversible electrochemistry on the electron conductor surface can be used. The electron mediator is coupled with a naturally occurring enzyme that is dependent on that electron mediator, an enzyme modified to be dependent on that electron mediator, or a synthetic enzyme that is dependent on that electron mediator. Examples of electron mediators that provide reversible electrochemistry on the electron conductor surface is pyrroloquinoline quinone (PQQ), phenazine methosulfate, dichlorophenol indophenol, short chain ubiquinones and potassium ferricyanide. In this embodiment, the preferred electron mediator utilized with the bioanode is PQQ. Due to the capability of the electron mediator to provide reversible electrochemistry at the electron conductor surface, no electrocatalyst is necessary to catalyze the redox reaction in this embodiment.

3. Electrocatalyst for an Electron Mediator

Generally, the electrocatalyst is a substance that facilitates the release of electrons at the electron conductor. Stated another way, the electrocatalyst improves the kinetics of a reduction or oxidation of an electron mediator so the electron mediator reduction or oxidation can occur at a lower standard reduction potential. The electrocatalyst can be reversibly oxidized at the bioanode to produce electrons and thus, electricity. When the electrocatalyst is adjacent to the electron conductor, the electrocatalyst and electron conductor are in electrical contact with each other, but not necessarily in physical contact with each other. In one embodiment, the electron conductor is part of, associates with, or is adjacent to an electrocatalyst for an electron mediator.

Generally, the electrocatalyst can be an azine, a conducting polymer or an electroactive polymer. Exemplary electrocatalysts are methylene green, methylene blue, luminol, nitrofluorenone derivatives, azines, osmium phenanthrolinedione, catechol-pendant terpyridine, toluene blue, cresyl blue, nile blue, neutral red, phenazine derivatives, tionin, azure A, azure B, toluidine blue O, acetophenone, metallophthalocyanines, nile blue A, modified transition metal ligands, 1,10-phenanthroline-5,6-dione, 1,10-phenanthroline-5,6-diol, [Re(phendione)$(CO)_3$Cl], [Re(phen-dione)$_3$]$(PF_6)_2$, poly(metallophthalocyanine), poly(thionine), quinones, diimines, diaminobenzenes, diaminopyridines, phenothiazine, phenoxazine, toluidine blue, brilliant cresyl blue, 3,4-dihydroxybenzaldehyde, poly(acrylic acid), poly(azure I), poly(nile blue A), poly(methylene green), poly(methylene blue), polyaniline, polypyridine, polypyrole, polythiophene, poly (thieno[3,4-b]thiophene), poly(3-hexylthiophene), poly(3,4-ethylenedioxypyrrole), poly(isothianaphthene), poly(3,4-ethylenedioxythiophene), poly(difluoroacetylene), poly(4-dicyanomethylene-4H-cyclopenta[2,1-b;3,4-b'] dithiophene), poly(3-(4-fluorophenyl)thiophene), poly (neutral red), a protein, a metalloprotein, or stellacyanin. In one preferred embodiment, the electrocatalyst for the electron mediator is poly(methylene green).

4. Enzyme

An enzyme catalyzes the oxidation of the fuel fluid at the bioanode. As enzymes also reduce of an oxidant at the biocathode, they are more generally described infra at I.B.5. Generally, naturally-occurring enzymes, man-made enzymes, artificial enzymes and modified naturally-occurring enzymes can be utilized. In addition, engineered enzymes that have been engineered by natural or directed evolution can be used. Stated otherwise, an organic or inorganic molecule that mimics an enzyme's properties can be used in an embodiment of the present invention.

Specifically, exemplary enzymes for use in a bioanode are oxidoreductases. In one preferred embodiment, the oxidoreductases act on the CH—OH group or CH—NH group of the fuel.

In another preferred embodiment, the enzyme is a dehydrogenase. Exemplary enzymes in this embodiment include alcohol dehydrogenase, aldehyde dehydrogenase, formate dehydrogenase, formaldehyde dehydrogenase, glucose dehydrogenase, glucose oxidase, lactatic dehydrogenase, lactose dehydrogenase or pyruvate dehydrogenase. Preferably, the enzyme is an alcohol dehydrogenase. In still another embodiment, the enzyme is a PQQ-dependent dehydrogenase.

5. Enzyme Immobilization Material

An enzyme immobilization material is utilized in the biofuel cell at the bioanode and/or the biocathode. In one embodiment, the bioanode's enzyme immobilization material is permeable to the fuel fluid and immobilizes and stabilizes the enzyme. The immobilization material is permeable to the fuel fluid so the oxidation reaction of the fuel at the bioanode can be catalyzed by the immobilized enzyme.

Generally, an enzyme is used to catalyze redox reactions at the bioanode and/or the biocathode. In a microelectrode according to this invention, an enzyme is immobilized in an enzyme immobilization material that both immobilizes and stabilizes the enzyme. Typically, a free enzyme in solution loses its catalytic activity within a few hours to a few days, whereas a properly immobilized and stabilized enzyme can retain its catalytic activity for at least about 30 days to about 730 days. The retention of catalytic activity is defined as the enzyme having at least about 75% of its initial activity, which can be measured by chemiluminescence, electrochemical, UV-Vis, radiochemical, or fluorescence assay.

An immobilized enzyme is an enzyme that is physically confined in a certain region of the enzyme immobilization material while retaining its catalytic activity. There are a variety of methods for enzyme immobilization, including carrier-binding, cross-linking and entrapping. Carrier-binding is the binding of enzymes to water-insoluble carriers. Cross-linking is the intermolecular cross-linking of enzymes by bifunctional or multifunctional reagents. Entrapping is incorporating enzymes into the lattices of a semipermeable material. The particular method of enzyme immobilization is not critically important, so long as the enzyme immobilization material (1) immobilizes the enzyme, (2) stabilizes the enzyme, and (3) is permeable to the fuel fluid or oxidant.

With reference to the enzyme immobilization material's permeability to the fuel fluid or oxidant and the immobilization of the enzyme, in one embodiment, the material is permeable to a compound that is smaller than an enzyme. Stated otherwise, the enzyme immobilization material allows the movement of the fuel fluid or oxidant compound through it so the compound can contact the enzyme. The enzyme immobilization material can be prepared in a manner such that it contains internal pores, channels, openings or a combination thereof, which allow the movement of the compound throughout the enzyme immobilization material, but which constrain the enzyme to substantially the same space within the enzyme immobilization material. Such constraint allows the enzyme to retain its catalytic activity. In one preferred embodiment, the enzyme is confined to a space that is substantially the same size and shape as the enzyme, wherein the enzyme retains substantially all of its catalytic activity. The pores, channels, or openings have physical dimensions that satisfy the above requirements and depend on the size and shape of the specific enzyme to be immobilized.

In one embodiment, the enzyme is preferably located within a pore of the enzyme immobilization material and the compound travels in and out of the enzyme immobilization material through transport channels. The relative size of the pores and transport channels can be such that a pore is large enough to immobilize an enzyme, but the transport channels are too small for the enzyme to travel through them. Further, a transport channel preferably has a diameter of at least about 10 nm. In still another embodiment, the pore diameter to a transport channel ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1 or more. In yet another embodiment, preferably, a transport channel has a diameter of at least about 10 nm and the pore diameter to a transport channel ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1 or more.

With respect to the stabilization of the enzyme, the enzyme immobilization material provides a chemical and mechanical barrier to prevent or impede enzyme denaturation. To this end, the enzyme immobilization material physically confines the enzyme, preventing the enzyme from unfolding. The process of unfolding an enzyme from a folded three-dimensional structure is one mechanism of enzyme denaturation. In one embodiment, the immobilization material, preferably, stabilizes the enzyme so that the enzyme retains its catalytic activity for at least about 30 days to about 730 days. The retention of catalytic activity is defined by the number of days that the enzyme retains at least about 75% of its initial activity. The enzyme activity can be measured by chemiluminescence, electrochemical, UV-Vis, radiochemical or fluorescence assay wherein the intensity of the property is measured at an initial time. The enzyme is considered to retain catalytic activity when the intensity is at least about 75% of the initial intensity. Typically, a fluorescence assay is used to measure the enzyme activity. A free enzyme in solution loses its catalytic activity within hours to a few days. Thus, the immobilization of the enzyme provides a significant advantage in stability. In another embodiment, preferably, the immobilized enzyme retains at least about 75% of its initial catalytic activity for at least about 30, 45, 60, 75, 90, 105, 120, 150, 180, 210, 240, 270, 300, 330, 365, 400, 450, 500, 550, 600, 650, 700, 730 days or more, preferably retaining at least about 80%, 85%, 90%, 95% or more of its initial catalytic activity for at least about 30, 45, 60, 75, 90, 105, 120, 150, 180, 210, 240, 270, 300, 330, 365, 400, 450, 500, 550, 600, 650, 700, 730 days or more.

In one embodiment, the enzyme immobilization material is a non-naturally occurring colloidal material. In another embodiment, the enzyme immobilization material is an acellular colloidal material, such as a liposome. An acellular material is not made up of and does not contain cells. A colloidal material is a substance that consists of particles dispersed throughout another substance which are too small for resolution with an ordinary light microscope but are incapable of passing through a semipermeable membrane. In further embodiment, a colloidal material is a substance consisting of particles substantially larger than atoms or ordinary molecules but too small to be visible to the unaided eye. They can range in size from about $10^{-7}$ to $10^{-3}$ centimeters and are linked or bonded together in a variety of ways.

In yet another embodiment, the enzyme immobilization material has a micellar or inverted micellar structure. Generally, the molecules making up a micelle are amphipathic, meaning they contain a polar, hydrophilic group and a nonpolar, hydrophobic group. The molecules can aggregate to form a micelle, where the polar groups are on the surface of the aggregate and the hydrocarbon, nonpolar groups are sequestered inside the aggregate. Inverted micelles have the opposite orientation of polar groups and nonpolar groups. The amphipathic molecules making up the aggregate can arrange themselves in a variety of ways so long as the polar groups are in proximity to each other and the nonpolar groups are in proximity to each other. Also, the molecules can form a bilayer with the nonpolar groups pointing toward each other and the polar groups pointing away from each other. Alternatively, a bilayer can form wherein the polar groups can point toward each other in the bilayer, while the nonpolar groups point away from each other.

Generally, the micellar or inverted micellar enzyme immobilization material can be a polymer, a ceramic, a liposome, or any other material made of molecules that form a micellar or inverted micellar structure. Exemplary micellar or inverted micellar enzyme immobilization materials are perfluoro sulfonic acid-polytetrafluoro ethylene (PTFE) copolymer (or perfluorinated ion exchange polymer)(Nafion® or Flemion®), modified perfluoro sulfonic acid-polytetrafluoro ethylene (PTFE) copolymer (or modified perfluorinated ion exchange polymer)(modified Nafion® or modified Flemion®), polysulfone, micellar polymers, poly(ethylene oxide) based block copolymers, polymers formed from microemulsion and/or micellar polymerization and copolymers of alkyl methacrylates, alkyl acrylates, and styrenes. Other exemplary micellar or inverted micellar immobilization materials are ceramics, sodium bis(2-ethylhexyl)sulfosuccinate, sodium dioctylsulfonsuccinate, lipids, phospholipids, sodium dodecyl sulfate, decyltrimethylammonium bromide, tetradecyltrimethylammonium bromide, (4-[(2-hydroxyl-1-naphthalenyl)azo]benzenesulfonic acid monosodium salt), linoleic acids, linolenic acids, colloids, liposomes and micelle networks.

In one preferred embodiment, the micellar enzyme immobilization material is a modified perfluoro sulfonic acid-PTFE copolymer (or modified perfluorinated ion exchange polymer)(modified Nafion® or modified Flemion®) membrane. The perfluorinated ion exchange polymer membrane is modified with a hydrophobic cation that is larger than the ammonium ($NH^{4+}$) ion. The hydrophobic cation serves the dual function of (1) dictating the membrane's pore size and (2)

acting as a chemical buffer to help maintain the pore's pH level, both of which further efforts to stabilize the enzyme.

With regard to the first function of the hydrophobic cation, mixture-casting a perfluoro sulfonic acid-PTFE copolymer (or perfluorinated ion exchange polymer) with a hydrophobic cation to produce a modified perfluoro sulfonic acid-PTFE copolymer (or modified perfluorinated ion exchange polymer)(Nafion® or Flemion®) membrane provides an enzyme immobilization material wherein the pore size is dependent on the size of the hydrophobic cation. Accordingly, the larger the hydrophobic cation, the larger the pore size. This function of the hydrophobic cation allows the pore size to be made larger or smaller to fit a specific enzyme by varying the size of the hydrophobic cation.

Regarding the second function of the hydrophobic cation, the properties of the perfluoro sulfonic acid-PTFE copolymer (or perfluorinated ion exchange polymer) membrane are altered by exchanging the hydrophobic cation for protons as the counterion to the —$SO^{3-}$ groups on the perfluoro sulfonic acid-PTFE copolymer (or perfluorinated ion exchange polymer) membrane. This change in counterion provides a buffering effect on the pH because the hydrophobic cation has a much greater affinity for the —$SO^{3-}$ sites than protons do. This buffering effect of the membrane causes the pH of the pore to remain substantially unchanged changes in the solution's pH. In addition, the membrane provides a mechanical barrier, which further protects the immobilized enzymes.

The following table demonstrates the buffering effect of the modified perfluoro sulfonic acid-PTFE copolymer membrane. The values represent the number of available exchange sites for protons per gram of modified perfluoro sulfonic acid-PTFE copolymer membrane; as the number of exchange sites available to protons decreases, the buffering capacity of the membrane toward the immobilized enzyme increases.

The membrane abbreviations designate the following membranes: $NH_4Br$ is an ammonium bromide-modified Nafion® membrane, TMABr is a tetramethylammonium bromide-modified Nafion® membrane, TEABr is a tetraethylammonium bromide-modified Nafion® membrane, TpropABr is a tetrapropylammonium bromide-modified Nafion® membrane, TBABr is a tetrabutylammonium bromide-modified Nafion® membrane, and TpentABr is a tetrapentylammonium bromide-modified Nafion® membrane.

| Membrane | Mixture-Cast ($\times 10^{-6}$ mole/g) | Salt-Extracted ($\times 10^{-6}$ mole/g) |
| --- | --- | --- |
| Nafion ® | 907 ± 68 | — |
| $NH_4Br$ | 521 ± 74 | 591 ± 95 |
| TMABr | 171 ± 19 | 458 ± 27 |
| TEABr | 157 ± 4 | 185 ± 22 |
| TPropABr | 133 ± 6 | 138 ± 77 |
| TBABr | 8.68 ± 2.12 | 96 ± 23 |
| TPentABr | 2.71 ± 0.6 | 1.78 ± 1.66 |

In order to prepare a modified perfluoro sulfonic acid-PTFE copolymer (or perfluorinated ion exchange polymer) membrane, the first step is to cast a suspension of perfluoro sulfonic acid-PTFE copolymer (or perfluorinated ion exchange polymer), particularly Nafion®, with a solution of the hydrophobic cations to form a membrane. After extracting the excess hydrophobic cations and their salts from the original membrane, the membrane is re-cast. Upon re-casting, the membrane contains the hydrophobic cations in association with the —$SO^{3-}$ sites of the perfluoro sulfonic acid-PTFE copolymer (or perfluorinated ion exchange polymer) membrane.

In order to make more stable and reproducible quaternary ammonium salt-treated Nafion® membranes, the excess bromide salts must be removed from the casting solution. This salt-extracted membrane is formed by re-casting the mixture-cast membranes after the excess quaternary ammonium bromide and HBr salts have been extracted from the original membranes. Salt extraction of membranes retains the presence of the quaternary ammonium cations at the sulfonic acid exchange sites, but eliminates complications from excess salt that may be trapped in the pore or may cause voids in the equilibrated membrane. The chemical and physical properties of the salt-extracted membranes have been characterized by voltammetry, ion exchange capacity measurements, and fluorescence microscopy before enzyme immobilization.

Exemplary hydrophobic cations are ammonium-based cations, quaternary ammonium cations, alkyltrimethylammonium cations, alkyltriethylammonium cations, organic cations, phosphonium cations, triphenylphosphonium, pyridinium cations, imidazolium cations, hexdecylpyridinium, ethidium, viologens, methyl viologen, benzyl viologen, bis(triphenylphosphine)iminium, metal complexes, bipyridyl metal complexes, phenanthroline-based metal complexes, [Ru(bipyridine)$_3$]$^{2+}$ and [Fe(phenanthroline)$_3$]$^{3+}$.

In one preferred embodiment, the hydrophobic cations are ammonium-based cations. In particular, the hydrophobic cations are quaternary ammonium cations. In another embodiment, the quaternary ammonium cations are represented by formula (1):

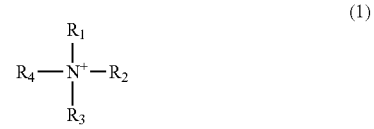

(1)

wherein $R_1$, $R_2$, $R_3$, and $R_4$ are independently hydrogen, hydrocarbyl, substituted hydrocarbyl, or heterocyclo wherein at least one of $R_1$, $R_2$, $R_3$, and $R_4$ is other than hydrogen. In a further embodiment, preferably, $R_1$, $R_2$, $R_3$, and $R_4$ are independently hydrogen, methyl, ethyl, propyl, butyl, pentyl, hexyl, heptyl, octyl, nonyl or decyl wherein at least one of $R_1$, $R_2$, $R_3$, and $R_4$ is other than hydrogen. In still another embodiment, $R_1$, $R_2$, $R_3$, and $R_4$ are the same and are methyl, ethyl, propyl, butyl, pentyl or hexyl. In yet another embodiment, preferably, $R_1$, $R_2$, $R_3$, and $R_4$ are butyl. In still another embodiment, three of $R_1$, $R_2$, $R_3$, and $R_4$ are the same and are methyl, ethyl, propyl, butyl, pentyl or hexyl and the other of $R_1$, $R_2$, $R_3$, and $R_4$ is pentyl, hexyl, heptyl, octyl, nonyl, decyl, undecyl, phenyl, tolyl, or xylyl. In a further embodiment, preferably, three of $R_1$, $R_2$, $R_3$, and $R_4$ are the same and are methyl or ethyl and the other of $R_1$, $R_2$, $R_3$, and $R_4$ is hexyl, heptyl, octyl, nonyl, decyl or phenyl.

Mixture-cast films of quaternary ammonium salts (e.g., TBAB, triethylhexylammonium bromide, trimethyloctylammonium bromide, and phenyltrimethylammonium bromide) and Nafion® have increased the mass transport of small analytes through the films and decreased the selectivity of the enyme immobilization membrane against anions. These enyme immobilization membranes have very similar conductivities as unmodified Nafion, but they have a much higher preference to the quaternary ammonium bromide than to the proton, as shown by titrating the number of available exchange sites to protons in the enyme immobilization membranes. Therefore, these films have similar electrical properties, but very different acid/base properties. The treated enyme immobilization membranes maintain their neutral pH over a wide range of buffer pHs. In light of these advantages, the preferred enzyme immobilization material is a quaternary ammonium salt treated perfluoro sulfonic acid-PTFE copolymer (or modified perfluorinated ion exchange polymer) (modified Nafion® or modified Flemion®) membrane. More preferably, the enzyme immobilization material is a TBAB-modified Nafion® membrane material. Even more preferably, the enzyme immobilization material is a triethylhexylammonium bromide-modified Nafion® membrane material, phenyltrimethylammonium bromide-modified Nafion® membrane material, or a trimethyloctylammonium bromide-modified Nafion® membrane material.

6. Bioanode Embodiments

In a further embodiment, preferably, the bioanode is composed of an electron conductor that is modified by adsorbing, polymerizing, or covalent bonding an electrocatalyst onto the electron conductor. This embodiment has an advantage of increasing the surface area of the electron conductor. The treatment of the electron conductor by adsorbing an electrocatalyst on the surface of the electron conductor prior to fabrication and subsequent chemical or electrochemical polymerization of the electrocatalyst leads to higher catalytic activities compared to untreated electron conductors.

In a further embodiment, the electron mediator can be physically bound to the enzyme. The physical bond can be a covalent or ionic bond between the electron mediator and the enzyme. In still another embodiment, if the electron mediator is capable of reversible electrochemistry at the electron conductor, the electron mediator can be physically bound to the enzyme and the electron mediator can also be physically bound to the electron conductor.

In still another embodiment, the electron mediator is immobilized in the immobilization material. In a preferred embodiment, the electron mediator is oxidized NAD+ immobilized in a cation-modified perfluoro sulfonic acid-PTFE copolymer (cation-modified Nafion®) membrane. In this embodiment, after the fuel fluid is added to the cell, the NAD+ is reduced to NADH and the NADH can diffuse through the cation-modified perfluoro sulfonic acid-PTFE copolymer (cation-modified Nafion®) membrane.

In another embodiment, the present invention involves immobilizing dehydrogenase enzymes in salt-extracted tetrabutylammonium/perfluorinated ion exchange polymer membranes (e.g., Nafion® membranes or Flemion® membranes [Asahi Glass Co., Tokyo]). The salt-extracted polymer suspension is neutral, and buffered enzyme solutions can be added to this suspension. The mixture can be cast onto a bioanode to form a modified bioanode, wherein the enzyme is immobilized near the bioanode's surface.

In another embodiment, the invention is drawn to a modified enzyme immobilization material, which results in a neutral pH within the micelles of the material, and to one or more enzymes, which is/are incorporated within a micelle of the modified enzyme immobilization material. The preferred enzyme immobilization material is a Nafion® polymer. Preferred enzymes are redox enzymes, such as dehydrogenases, which catalyze the oxidation of an organic fuel and the reduction of an electron mediator.

In yet another embodiment, the invention is drawn to a fuel cell comprising a bioanode and a cathode, wherein the bioanode comprises an electrocatalyst, an enzyme immobilization material, and an enzyme. The enzyme is incorporated within a micellar compartment of the enzyme immobilization material. Preferably, the enzyme immobilization material is a salt-extracted quaternary ammonium treated perfluorinated ion exchange polymer. Commercially available perfluorinated ion exchange polymers include Nafion® (DuPont) and Flemion® (Asahi Glass). Preferably, the perfluorinated ion exchange polymer is a Nafion® polymer or Flemion® polymer. Preferred quaternary ammonium salts include tetrabutylammonium bromide. A preferred electrocatalyst is polymethylene green. The bioanode may comprise more than one different enzyme, such as an alcohol dehydrogenase and an aldehyde dehydrogenase.

See FIG. 2 for a schematic of the redox reactions occurring at the bioanode in one preferred embodiment. There, a fuel fluid of ethanol (24) is being catalyzed by the enzyme (23), $NAD^+$-dependent alcohol dehydrogenase (ADH). Further, the electron mediator ($NAD^+$) is reacting with the electrocatalyst (poly(methylene green)) (22), which is in turn is in contact with the carbon cloth (21) electron conductor to release electrons.

B. Biocathode

The biocathode in accordance with this invention comprises an electron conductor, an enzyme which is immobilized in an enzyme immobilization material, an electron mediator, and an electrocatalyst. In one embodiment, these components are adjacent to one another, meaning they are physically or chemically connected by appropriate means. Other embodiments are detailed infra at I.B.6. As the components are generally the same as the bioanode components, the following discussion concerns the differences in composition of the respective elements and differences in function, where appropriate.

1. Electron Conductor

As with the bioanode, the biocathode's electron conductor can be organic or inorganic in nature as long as it (1) is able to conduct electrons through the material, (2) has high surface area, and (3) can be dispersed as small particulate. In the preferred embodiment, the biocathode electron conductor is formed from a carbon-based ink.

2. Electron Mediators

The biocathode electron mediator serves to accept or donate electron(s), readily changing from oxidized to reduced forms. The electron mediator is a compound that can diffuse into the immobilization material and/or be incorporated into the immobilization material. As with the bioanode, the electron mediator's diffusion coefficient is maximized in one embodiment.

The biocathode's electron mediator can be a protein such as stellacyanin, a protein byproduct such as bilirubin, a sugar such as glucose, a sterol such as cholesterol, a fatty acid, or a metalloprotein. The electron mediators can also be any coenzyme or substrate of any oxidase. In one preferred embodiment, the electron mediator at the biocathode is bilirubin.

3. Electrocatalyst for an Electron Mediator

Generally, the electrocatalyst is a substance that facilitates the release of electrons at the electron conductor, reducing the standard reduction potential of the electron mediator.

The electrocatalyst is present in a concentration that facilitates the efficient transfer of electrons. Preferably, the electrocatalyst is at a concentration of between about 100 mM and about 3 M, more preferably between about 250 mM and about 2.25 M, still more preferably between about 500 mM and about 2 M, and most preferably between about 1.0 M and about 1.5 M.

Generally, electrocatalysts according to the invention are organometallic cations with standard reduction potentials greater than +0.4 volts. Exemplary electrocatalysts are transition metal complexes, such as osmium, ruthenium, iron, nickel, rhodium, rhenium, and cobalt complexes. Preferred organometallic cations using these complexes comprise large organic aromatic ligands that allow for large electron self exchange rates. Examples of large organic aromatic ligands include derivatives of 1,10-phenanthroline (phen), 2,2'-bipyridine (bpy) and 2,2',2"-terpyridines (terpy), such as Ru(phen)$_3^{+2}$, Fe(phen)$_3^{+2}$, Ru(bpy)$_3^{+2}$, Os(bpy)$_3^{+2}$, and Os(terpy)$_3^{+2}$. In a preferred embodiment, the electrocatalyst is a ruthenium compound. Most preferably, the electrocatalyst at the biocathode is Ru(bpy)$_3^{+2}$.

4. Enzyme

In accordance with the invention, an enzyme reduces of an oxidant at the biocathode. Generally, naturally-occurring enzymes, man-made enzymes, artificial enzymes and modified naturally-occurring enzymes can be utilized. In addition, engineered enzymes that have been engineered by natural or directed evolution can be used. Stated otherwise, an organic or inorganic molecule that mimics an enzyme's properties can be used in an embodiment of the present invention.

Specifically, exemplary enzymes for use in a biocathode are oxidoreductases. Potential oxidoreductases include laccases and oxidases, such as glucose oxidase, alcohol-based oxidases, and cholesterol-based oxidases. In a preferred embodiment, the enzyme is an oxygen oxidoreductase. More preferably, the enzyme is an oxygen oxidoreductase having an optimum activity at a pH between about 6.5 and about 7.5. Most preferably, the enzyme is a bilirubin oxidase.

5. Enzyme Immobilization Material

As noted supra at I.B.5., an enzyme immobilization material is utilized in the biofuel cell at the bioanode and/or the biocathode. Further detail regarding the composition of the enzyme immobilization material and the immobilization mechanism can be found supra at I.A.5. In one embodiment, the biocathode's enzyme immobilization material is permeable to the oxidant and immobilizes and stabilizes the enzyme. The immobilization material is permeable to the fuel fluid so the reduction of the oxidant at the biocathode can be catalyzed by the immobilized enzyme. Preferably, the enzyme immobilization material is a quaternary ammonium salt treated perfluoro sulfonic acid-PTFE copolymer (or modified perfluorinated ion exchange polymer)(modified Nafion® or modified Flemion®) membrane. More preferably, the enzyme immobilization material is a tetrabutylammonium bromide (TBAB) treated Nafion® membrane material. Even more preferably, the enzyme immobilization material is a triethylhexylammonium bromide treated Nafion® membrane material, a trimethyloctylammonium bromide treated Nafion® membrane material, or a phenyltrimethylammonium bromide treated Nafion® membrane material.

6. Biocathode Embodiments

In one embodiment, the biocathode comprises an enzyme immobilization material, which acts to immobilize the cathode's enzyme while facilitating the redox reactions taking place at the biocathode. The enzyme, electrocatalyst, and electron mediator are preferably located within a pocket or micelle of the enzyme immobilization material. In a preferred embodiment, the enzyme immobilization material comprises a material that is capable of forming micelles or inverted micelles, which in turn are capable of incorporating and stabilizing an enzyme, and other areas such as pores, channels, openings, or a combination thereof that can incorporate the electrocatalyst and electron mediator. Preferably, the micelle also has buffering capability, i.e., the micellar structure comprises a buffering moiety. This buffered micellar structure of the enzyme immobilization material facilitates the direct transfer of electrons to and from the electrode and the electrocatalyst or electron mediator.

In yet another embodiment, the invention is drawn to a fuel cell comprising a biocathode and an anode, wherein the biocathode comprises an electrocatalyst, an enzyme immobilization material, and an enzyme. The enzyme is incorporated within a micellar compartment of the enzyme immobilization material. Preferably, the enzyme immobilization material is a salt-extracted quaternary ammonium treated perfluorinated ion exchange polymer. Commercially available perfluorinated ion exchange polymers include Nafion® (DuPont) and Flemion® (Asahi Glass). Preferably, the perfluorinated ion exchange polymer is a Nafion® polymer or Flemion® polymer. Preferred quaternary ammonium salts include tetrabutylammonium bromide. A preferred electrocatalyst is polymethylene green. The biocathode may comprise more than one different enzyme.

See FIG. 1 for a schematic of the redox reactions taking place at a biocathode in a preferred embodiment. There, electrons from the electron conductor (electrode) (13) are used in the redox reactions between the electrocatalyst (Ru(bipyridine)$_3^{+2}$) located in (15), the electron mediator (bilirubin), the enzyme (bilirubin oxidase) (14), and an oxidant (11) to form a water byproduct. The enzyme (14) is stabilized in a micellar structure (12) of the enzyme immobilization material (10).

C. Microfluidic Channel

Beyond the bioanode and/or biocathode, the microfluidic biofuel cell is characterized by at least one microfluidic channel that, in service, houses the bioanode and/or the biocathode, the fuel fluid, and the oxidant. The microfluidic channel's configuration can vary depending on the application. In one embodiment, the microfluidic channel can simply be a rectangular chamber with the bioanode and/or the biocathode of the biofuel cell contained therein. See FIG. 4. In other embodiments, the configuration of the microfluidic channel can be more elaborate for any desired purpose, such as to ensure that the bioanode solution and the biocathode solution do not come into physical contact with one another. See FIG. 5.

Figure 4:
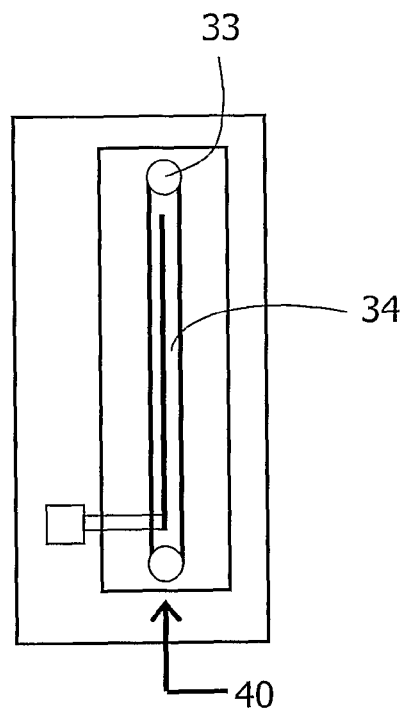
FIG. 4 is a schematic showing a single, functional bioanode or biocathode.
Figure 5:
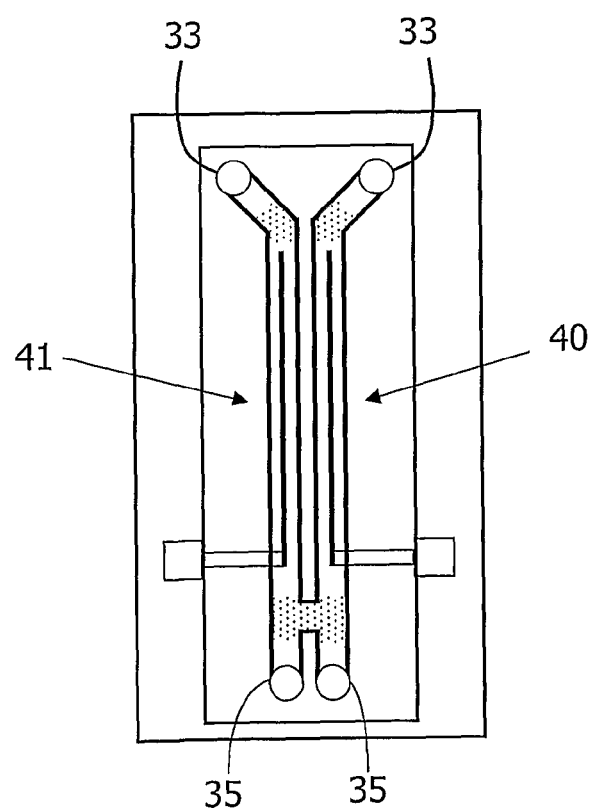
FIG. 5 is a schematic showing a microfluidic biofuel cell.

With reference to FIGS. 4 and 5, the fuel fluid and/or oxidant flow through the microfluidic channel (34), over or through the microelectrode(s), from one end of the microfluidic channel (entry) (33) to the opposite end (exit) (35). In FIG. 5, the bioanode is represented by (41) and the biocathode is represented by (40). The microfluidic channel should facilitate convective flow of the fuel fluid and/or oxidant over the microelectrode(s) while preventing leakage of the same outside the microfluidic channel (34).

E. Fuel Fluid and Oxidant

A fuel fluid that can be oxidized to produce electrons at the bioanode and an oxidant that can be reduced to produce water at the biocathode are components of the microfluidic biofuel cell of this invention.

The fuel fluid for the bioanode is consumed in the oxidation reaction of the electron mediator and the immobilized enzyme. The fuel fluid's molecular size is small enough so the diffusion coefficient through the enzyme immobilization material is large. Exemplary fuel fluids are hydrogen, ammonia, alcohols (such as methanol, ethanol, propanol, isobutanol, butanol and isopropanol), allyl alcohols, aryl alcohols, glycerol, propanediol, mannitol, glucuronate, aldehyde, carbohydrates (such as glucose, glucose-1, D-glucose, L-glucose, glucose-6-phosphate, lactate, lactate-6-phosphate, D-lactate, L-lactate, fructose, galactose-1, galactose, aldose, sorbose and mannose), glycerate, coenzyme A, acetyl Co-A, malate, isocitrate, formaldehyde, acetaldehyde, acetate, citrate, L-gluconate, beta-hydroxysteroid, alpha-hydroxysteroid, lactaldehyde, testosterone, gluconate, fatty acids, lipids, phosphoglycerate, retinal, estradiol, cyclopentanol, hexadecanol, long-chain alcohols, coniferyl-alcohol, cinnamyl-alcohol, formate, long-chain aldehydes, pyruvate, butanal, acyl-CoA, steroids, amino acids, flavin, NADH, $NADH_2$, NADPH, $NADPH_2$, hydrocarbons, and amines. In a preferred embodiment, the fuel fluid is an alcohol, more preferably methanol and/or ethanol; and most preferably ethanol.

The oxidant for the biocathode is consumed in the reduction reaction of the electron mediator and the immobilized enzyme using electrons supplied by the bioanode. The oxidant's molecular size is small enough so the diffusion coefficient through the enzyme immobilization material is large. Any means of supplying a source of the oxidant can be utilized.

In a preferred embodiment, the oxidant is gaseous oxygen, which is transported to the biocathode via diffusion. In another preferred embodiment, the oxidant is a peroxide compound.

Either electrophoretic or hydrodynamic pumping can be used to transport the fuel fluid and oxidant through the microfluidic channels. In an embodiment utilizing hydrodynamic pumping, the fuel fluid flow rate is between about 0.01 µL/min and about 10 µL/min, preferably between about 0.5 µL/min and about 10 µL/min, more preferably between about 1 µL/min and about 5 µL/min, and most preferably at about 1 µL/min.

F. Electrical Connectors

The electrical connectors provide electrical contact from the microelectrodes to the electrical load external to the microfluidic biofuel cell. In the most general sense, the electrical connector can be any material and structure that facilitates the transfer of electrons from the bioanode to the electrical load and back to the biocathode. In one preferred embodiment, the electrical connector of the microfluidic biofuel cell provide attachment leads to which another device can make physical and electrical contact. This other device, e.g. copper wire, then transports electrons are transported to and from the external electrical load.

In one preferred embodiment, the electrical connector is a thin layer connector that is formed on the microfluidic biofuel cell's substrate prior to other processing. In this embodiment, the subsequently formed microelectrodes are arranged such that they intersect their respective electrical connectors. In an alternative embodiment, the electrical connector is a cylindrical body of electrically conductive material that is attached to the microelectrodes subsequent to their processing.

II. Microfluidic Biofuel Cell Fabrication

In fabricating a microfluidic biofuel cell in accordance with this invention, a substrate is used on which the other biofuel cell components are constructed. In a preferred embodiment, the first step is to form the electrical connectors, followed by the fabrication of the microelectrodes, and the optional step of defining a biofuel chamber. In an alternative embodiment, the electrical connectors are formed subsequent to the other features.

A. Fabrication of Electrical Connectors

The microfluidic biofuel cell of the invention is formed by providing a substrate onto which the remaining components are formed. The substrate can be made of any material that is not conductive, will not passivate the conductive material of the microelectrode, to which the conductive material will adhere throughout processing, and to which molds can be reversibly sealed. In one embodiment, the substrate is glass. In a preferred embodiment, the substrate is poly(dimethylsiloxane) (PDMS). In another preferred embodiment, the substrate is polycarbonate. In one embodiment, the substrate is flat. In alternative embodiments, the substrate can take on a geometric shape that advantageously suits the particular application.

In a preferred embodiment, the first biofuel cell feature formed on the substrate is an electrical connector, which will be in electrical contact with the microelectrodes in the completed biofuel cell to provide the means for connecting the external electrical load to the microelectrodes. The connector can be made of any electrically conductive material. Exemplary materials include platinum, palladium, gold, alloys of those precious metals, carbon, nickel, copper and stainless steel. In a preferred embodiment, the connector is made of platinum.

The connector can be formed on the substrate using conventional photolithographic techniques known in the silicon wafer industry. For example, to form a thin layer platinum electrical connector, a titanium adhesion layer is first sputtered onto the substrate. This is followed by sputtering a layer of platinum over the titanium layer. Both sputtering processes can be carried out, for example, in an argon-ion sputtering system. The connectors will then be defined by photolithography, with photoresist applied to the platinum layer to protect the desired connector locations. Chemical etching of the two layers with commercially available etchants followed by stripping of the photoresist will yield the finished platinum electrical connectors. In an alternative embodiment, the electrical connectors are the last feature formed. This embodiment is detailed infra at II.B.6.

B. Fabrication of Microelectrodes

Following the creation of electrical connectors on the biofuel cell's substrate, the next step is the fabrication of the bioanode and the biocathode. These can be formed in succession or simultaneously.

1. Bioanode Fabrication

In one embodiment, the bioanode and the biocathode are formed on the substrate in succession, where the order of formation is not critical. For the purposes of presentation only, the bioanode fabrication will be detailed first. The first step of fabricating a microscale bioanode is creating a pattern of a microchannel in the surface of a casting mold. In general, the casting mold can be made of any material that is not conductive, will not passivate the conductive material and is able to be reversibly sealed to the substrate, with exemplary materials including silicon, glass, and polymers. The casting mold is preferably made of a polymer, even more preferably made of PDMS. Most preferably, the casting mold is made of polycarbonate.

In a preferred embodiment where the casting mold is a polymer, the pattern is created by using known soft lithography techniques to produce the microchannel in the casting mold to define the shape and size of the bioanode. Soft lithography techniques generally entail the process of molding a prepolymer against a lithographically-defined master that has a raised image of the desired design. The soft lithography technique employed should be able to yield microchannels in the casting mold between about 1 µm to about 1 mm, between about 1 µm to about 200 µm, preferably between about 10 µm to about 200 µm, more preferably between about 10 µm to about 100 µm, and most preferably as small as about 10 µm or less. Exemplary soft lithography techniques include near-field phase shift lithography, replica molding, microtransfer molding (µTM), solvent-assisted microcontact molding (SAMIM), and microcontact printing (µCP). Preferably, the microchannels are formed using replica molding.

Figure 3A:
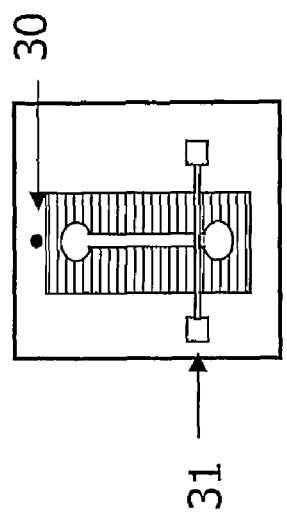
FIGS. 3(a)-(d) are schematics showing the procedure for forming a single microelectrode.

After the microchannel is formed in the casting mold, the patterned side of the casting mold is adhered to the substrate to complete the mold of the microelectrode. See FIG. 3(a). In the embodiment where the electrical connector (31) has previously been formed on the substrate, the microchannel should align over the electrical connector such that the finished microelectrode will be in electrical contact with the connector. Further, a tubing connector (30) is adhered to the substrate to maintain the position that will later become the entry reservoir.

Figure 3B:
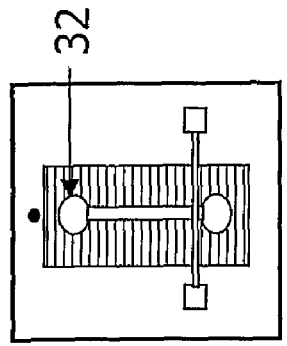

Next, with reference to FIG. 3(b), an electron conductor solution is flowed into the casting mold's microchannel through an entry reservoir (32) that has been created in the casting mold at one end of the microchannel. This entry reservoir (32) is analogous to a pouring basin in the traditional art of metal casting. Excess solution will exit the microchannel at a vent located at the end of the microchannel opposite the entry reservoir.

The electron conductor solution can be any solution that comprises an electron conductor source and a liquid carrier that can be removed via curing to yield a solid microelectrode. The numerous potential electron conductor materials are listed above in I.A.1. In one preferred embodiment, the electron conductor source is a carbon source. In a more preferred embodiment, the electron conductor source is a carbon-based ink. In one such embodiment, the liquid carrier is a carbon-based ink thinner, e.g., Ercon N160 Solvent Thinner. Depending on the nature of the liquid carrier in the solution, two types of microelectrode structures can be formed according to the invention—solid microelectrodes or flow through microelectrodes. With lower viscosity liquid carriers, solid microelectrodes are produced. These microelectrodes are substantially continuous and solid, and fuel fluid flows over such microelectrodes during use. With higher viscosity liquid carriers, flow through microelectrodes are produced with a structure enabling fuel fluid to flow therethrough during use, effectively increasing the surface area of the microelectrode in contact with the fuel fluid.

Regardless of the particular structure, a microelectrode formed in accordance with this invention has several advantages over microelectrodes formed using traditional processes, which necessarily have flat topography. As such, any fluid flowing over conventional microelectrodes has a generally regular flow pattern and is in contact with a generally defined amount of microelectrode surface area. This flat geometric surface area is calculated by adding the rectangular surface area of the top and sides of the flat microelectrode. As current production of a microelectrode is determined in large part by the surface area in contact with the fuel fluid, a flat microelectrode's current production capabilities can only be increased by increasing its size. In contrast, microelectrodes formed in accordance with this invention have highly irregular, three dimensional topography, which yields at least two distinct advantages. First, the effective surface area of the invention's microelectrode is substantially increased compared to a flat screen printed microelectrode. The effective surface area of the microelectrodes herein described is the sum of surface area of the individual peaks and valleys characterizing the microelectrode's topography. One accurate method of calculating this effective surface area is to compare the current output of a microelectrode formed according to the invention with a flat microelectrode of the same length, width, and height dimensions. For example, such analysis of microelectrodes has shown current output of $9.85 \times 10^{-4}$ $A/cm^2$ for a microelectrode of this invention, compared to $2.06 \times 10^{-4}$ $A/cm^2$ for a conventional glassy carbon electrode. Further, the microelectrode's irregular topography can create turbulent flow of the fluid. Such a flow pattern is advantageous because it induces mixing of the fluid over the microelectrode, which in turn increases the transport rate of the fluid to the microelectrode. Increasing the transport rate of the fluid facilitates the reactions taking place within the microelectrode, thereby increasing the microelectrode's current load capability.

In one alternative embodiment, a primer is flowed into the casting mold's microchannels and quickly dried prior to introducing the electron conductor solution. The primer can be any material that will help prevent the electron conductor from becoming semi-permanently attached to the casting mold. For example, in the carbon-based ink embodiment, carbon-based ink thinner can be used as a primer, if one is desired.

Figure 3C:
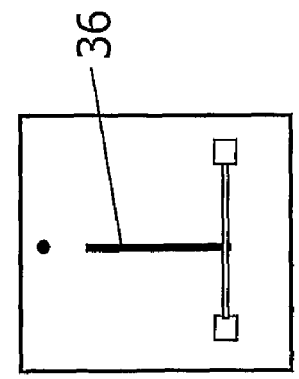

After the solution fills the casting mold's microchannels, heat is applied to cure the electron conductor solution. In general, heating should be conducted at a temperature sufficient to remove the liquid carrier from the solution, but low enough so that the resulting microelectrode is not damaged. In one preferred embodiment, heating occurs at about 75° C. Also, heat should be applied for a time sufficient to remove substantially all of the liquid carrier from the solution. In one preferred embodiment, heat is applied for at least about one hour. In another preferred embodiment, heating occurs at about 75° C. for about one hour. With reference to FIG. 3(c), the curing process yields a solidified microelectrode (36) that is approximately 20% smaller than the original size of the casting mold's microchannel(s) due to evaporation of the carrier.

Figure 3D:
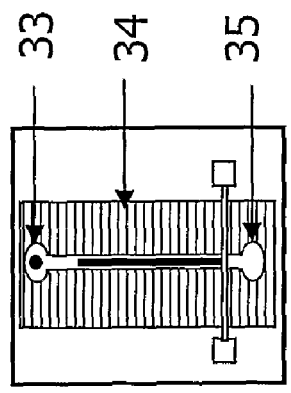

In the method according to the invention, the microelectrode is treated to impart an electron mediator, an optional electrocatalyst for the electron mediator, an enzyme, and an enzyme immobilization material thereto to form a bioanode via one of at least four embodiments. In a first embodiment, the enzyme immobilization material containing the enzyme is applied to the cured microelectrode, followed by the introduction of the electron mediator and the optional electrocatalyst. To form the bioanode, the casting mold is removed from the substrate after curing the microelectrode. See FIG. 3(c). With reference to FIG. 3(d), in place of the casting mold, a gas-permeable mold with a microchannel (34) approximately twice the width of the casting mold's microchannel is reversibly sealed over the microelectrode. The gas-permeable mold can be made of any material that is not conductive, will not passivate the electron conductor and facilitates evaporation of a solvent. Preferably, a silicon polymer, such as PDMS, is used as the gas-permeable mold material. More preferably, a thermoplastic resin, such as polycarbonate, is the gas-permeable mold material. After the gas-permeable mold is in place, an enzyme immobilization material containing a bioanode enzyme is applied to the cured microelectrode. This is accomplished by syringe pumping the casting solution into the entry reservoir (33) and through the gas-permeable mold to an exit vent (35). At this point, an electron mediator solution optionally comprising an electrocatalyst is hydrodynamically flowed through the gas-permeable mold's microchannel using an entry reservoir (33) and a vent (35) as described above. With the width of the microchannel approximately twice the width of the microelectrode, a small amount of the electron mediator solution will inevitably coat onto the substrate; however, this ensures that the entire microelectrode is properly coated. The electron mediator solution's solvent is then allowed to evaporate through the gas-permeable mold or through an entry reservoir and/or vent in the mold, leaving a bioanode. If the electron mediator needs to be polymerized, an electropolymerization process can be utilized to that end. This embodiment is less desirable if the electron mediator needs to be electropolymerized. See FIG. 3(d) for a finished bioanode.

Therefore, in a more preferred second embodiment, the electron mediator and the optional electrocatalyst are applied to the solidified microelectrode, the electron mediator is electropolymerized if needed, and then the enzyme immobilization material containing the enzyme is applied to the microelectrode. In the second embodiment, the casting mold is removed from the substrate after curing the microelectrode. In place of the casting mold, a gas-permeable mold as detailed above is reversibly sealed over the microelectrode. Here, an electron mediator solution optionally comprising an electrocatalyst is hydrodynamically flowed through the gas-permeable mold's microchannel using an entry reservoir and a vent as described above. Again, a small amount of the electron mediator solution will inevitably coat onto the substrate, but this ensures that the entire microelectrode is properly coated. The electron mediator solution's solvent is then allowed to evaporate through the gas-permeable mold, leaving an electron mediator coated microelectrode. If the electron mediator needs to be polymerized, an electropolymerization process can be utilized to that end. Next, an enzyme immobilization material containing a bioanode enzyme is applied to from the bioanode. This is accomplished by syringe pumping a solution containing the enzyme immobilization material and the bioanode enzyme into the entry reservoir and through the gas-permeable mold.

In an even more preferred third embodiment, the electron mediator and the optional electrocatalyst are introduced to the electron conductor solution prior to injection into the casting mold, and after curing, the enzyme immobilization material containing the enzyme is applied to the cured microelectrode. In the third embodiment, the electron mediator and the optional electrocatalyst are suspended in the electron conductor solution prior to introduction into the casting mold's microchannel. The modified electron conductor solution is then flowed into the casting mold's microchannel and cured, as detailed above at II.A. This embodiment advantageously enhances the bioanode's conductivity, increases simplicity by eliminating a processing step, and improves electron mediator transport efficiency. The embodiment also yields a highly conductive composite bioanode with the selectivity properties of the individual electron mediator, while also possessing the transport efficiency of a gas diffusion style anode. Electropolymerization of the electron mediator can be carried out at this time if required. Thereafter, an enzyme immobilization material containing a bioanode enzyme is applied to the modified microelectrode to form the bioanode. This is accomplished by syringe pumping a solution containing the enzyme immobilization material and the bioanode enzyme into the entry reservoir and through the gas-permeable mold.

In the most preferred fourth embodiment, the electron mediator, the optional electrocatalyst, and the enzyme immobilization material containing the enzyme are all combined in the electron conductor solution prior to injection into the casting mold to produce, upon curing, a complete bioanode according to the invention. In the fourth and most preferred embodiment, the electron mediator, the optional electrocatalyst, and the enzyme immobilization material containing the enzyme are all combined in the electron conductor solution. The solution is then introduced into the casting mold as detailed above. Curing the modified solution forms a complete bioanode according to the invention. This embodiment represents the simplest bioanode formation technique, eliminating excess steps and molds required by the other embodiments.

In all embodiments, the specific composition of the enzyme immobilization material, the enzyme, the electron mediator, and the optional electrocatalyst is detailed above in I.A.2.-I.A.4. The preferred enzyme immobilization material for the bioanode is a quaternary ammonium salt treated Nafion® membrane material, such as a TBAB-modified Nafion®, or preferably a triethylhexylammonium bromide-modified Nafion®, a trimethyloctylammonium bromide-modified Nafion® membrane material, or a phenyltrimethylammonium bromide-modified Nafion® membrane material. The preferred enzyme at the anode is an alcohol dehydrogenase. When an electron mediator/electrocatalyst combination is employed, they are preferably NAD$^+$ and poly(methylene green) respectively. If an electron mediator that provides reversible electrochemistry is used, the preferred electron mediator is PQQ. Also, the casting mold can include more than one microchannel in all embodiments.

2. Biocathode Fabrication

To form a biocathode in accordance with the invention, the same general processing steps taken to fabricate the bioanode can be used to produce a biocathode. The four general embodiments for treating the biocathode with the enzyme immobilization material, the enzyme, the electron mediator, and the electrocatalyst are the same as those for the bioanode, though the option of omitting the electrocatalyst is not applicable. The specific composition of the enzyme immobilization material, the enzyme, the electron mediator, and the electrocatalyst is detailed above in I.B.2.-I.B.5. The preferred enzyme immobilization material for the biocathode is a quaternary ammonium salt treated Nafion® membrane material, such as a TBAB-modified Nafion®, or preferably a triethylhexylammonium bromide-modified Nafion®, a trimethyloctylammonium bromide-modified Nafion® membrane material, or a phenyltrimethylammonium bromide-modified Nafion® membrane material. Additionally for the cathode, the preferred enzyme is bilirubin oxidase, the preferred electron mediator is bilirubin, and the preferred electrocatalyst is Ru(bpy)$_3^{2+}$ in a modified membrane.

3. Forming the Operational Biofuel Cell

After the bioanode and biocathode have been formed in accordance with this invention, the casting or gas-permeable molds are optionally removed. In this optional embodiment the bioanode and biocathode remain on the substrate. After the casting or gas-permeable molds are removed, a microfluidic channel form is aligned over the bioanode and biocathode. This form is micropatterned so as to create at least one microfluidic channel through which the biofuel cell's fuel fluid can flow. The form can be made of any material that is not conductive, will not passivate the conductive material and will adhere to the substrate. Preferably, the form is PDMS. More preferably, this overlay is polycarbonate. The micropatterns of the microfluidic channel(s) in the form can be created by using any known soft lithography technique. In one embodiment, the microfluidic channel is about two to four times larger than the microelectrodes. In another embodiment, the microfluidic channel is approximately the same size as the microelectrodes. The microfluidic channels of the form essentially define the electrochemical cell in which the fuel fluid will interface with the microelectrodes. When only one microfluidic channel is used to house the bioanode, biocathode, fuel fluid, and oxidant, the mixture of fuel fluid and oxidant in the same microfluidic chamber does not compromise the function of the microelectrodes of the invention because their redox reactions are selective. Stated another way, the bioanode will only react with fuel fluid and the biocathode will only react with the oxidant, and no cross reaction takes place.

In an alternative embodiment, the casting or gas-permeable mold(s) remain in contact with the substrate and serves to define the microfluidic channels of the biofuel cell, acting as the microfluidic channel form described above. In this embodiment, the fuel fluid travels through the space between the microchannels of the mold(s) and the bioanode or biocathode. In this embodiment, subsequent processing must be performed to create a junction between the individual bioanode and biocathode microfluidic channels. To form the junction, a passage connecting the individual microfluidic chambers is formed in the mold(s) by any appropriate means, such as applying a perpendicular force to the top of the mold(s) or removing sufficient material from the mold(s). Thereafter, the passage is covered by a material that will seal the junction to inhibit leakage of the fuel fluid or oxidant during operation. The material must be capable of being joined to the mold material to create the appropriate seal. In one embodiment, the covering material is simply a flat piece of the mold material, such as PDMS or polycarbonate.

4. Optional Formation Embodiments

The microelectrode fabrication technique described above in II.B.1. refers to the embodiment wherein the bioanode and the biocathode were formed successively, which was followed by a method of connecting the bioanode and biocathode via microchannels to form the biofuel cell. In an alternative embodiment, the bioanode and the biocathode can be formed simultaneously. In this embodiment, a single casting mold is patterned to form both the bioanode and biocathode. Alternatively, a combination of casting molds can be used to form the individual bioanode and biocathode. In either case, after the bioanode and biocathode are simultaneously formed, the operational biofuel cell is formed by either applying a microfluidic channel form or modifying the casting mold(s) as detailed above in II.B.3.

The embodiment described above in II.A. describes the formation of the electrical connectors on the substrate prior to other processing steps. In an alternative embodiment, the electrical connectors are added to the microfluidic biofuel cell as a final processing step. Here, holes are created in the microfluidic channel form or the modified casting mold(s) to expose a portion of each bioanode and biocathode. Next, electrical connectors are physically joined to the exposed portion of each bioanode and biocathode. In this embodiment, the electrical connectors can be any material in any structure that will enable the external electrical load to make electrical contact with the bioanode and biocathode. In one preferred embodiment, the electrical connectors are cylindrical copper bodies. Further, any joining technique capable of maintaining the electrical contact between the electrical connectors and the bioanode and biocathode can be employed. In one preferred embodiment, silver epoxy paste can be used to join the electrical connectors and the bioanode and biocathode electrically. This embodiment has the advantage of increasing the conductivity between these components.

The above embodiments have described a biofuel cell wherein both the bioanode and the biocathode are housed within the microchannel(s) of the biofuel cell. While this is the preferred embodiment, alternative embodiments of the invention include an anode or a cathode located external to the microchannel(s) of the biofuel cell. Here, a fuel cell is formed by combining a microfluidic bioanode or biocathode with the appropriate external anode or cathode.

C. Use of the Microfluidic Biofuel Cell

After fabrication of the operational microfluidic biofuel cell of this invention is complete, it can be utilized in myriad applications where a fluid fuel source and oxidant are available for the bioanode and biocathode respectively. In use, the fuel fluid and the oxidant travel through the microfluidic channel(s) to contact the bioanode and biocathode. There, the redox reactions described above at I. take place to create a current source. The microfluidic biofuel cell of the instant invention may be used in any application that requires an electrical supply, such as electronic devices, commercial toys, internal medical devices, and electrically powered vehicles. Further, the microfluidic biofuel cell of the instant invention may be implanted into a living organism, wherein the fuel fluid is derived from the organism and current is used to power a device implanted in the living organism.

Figure 6:
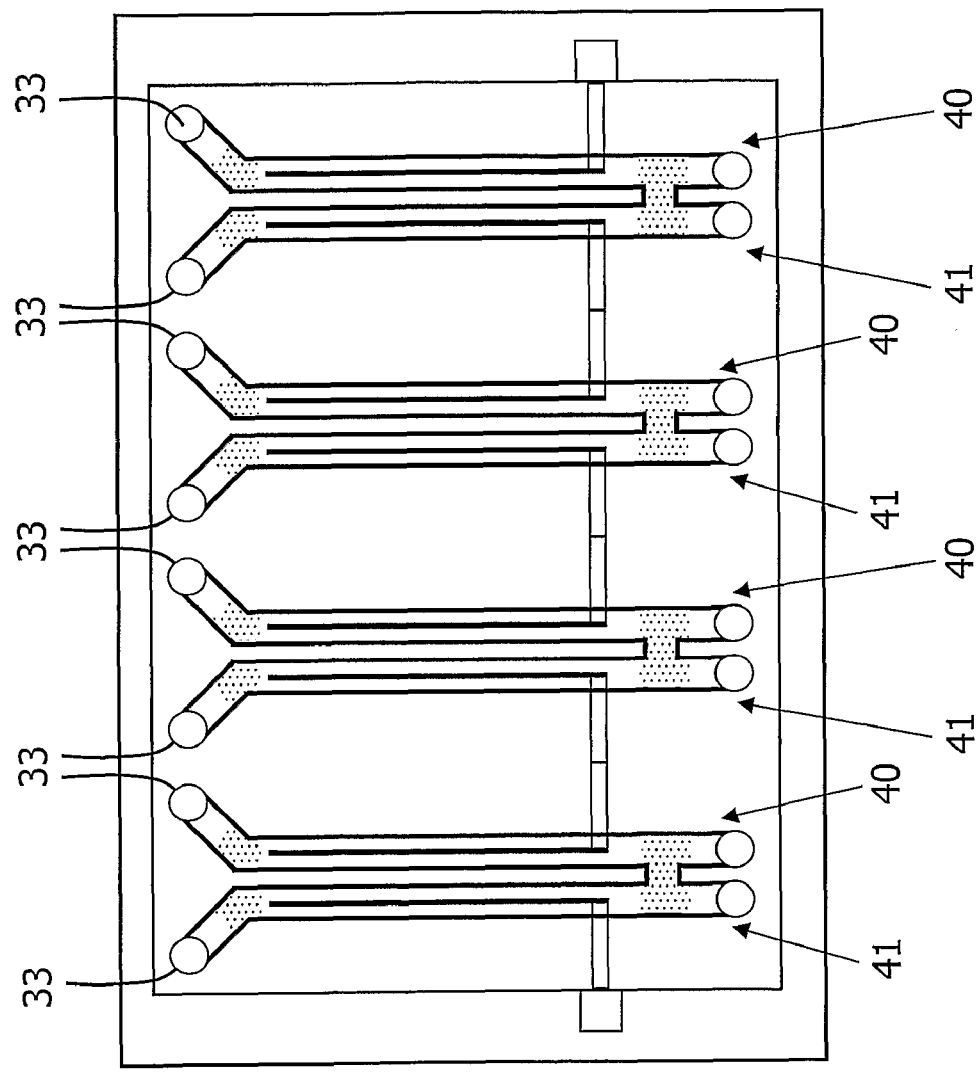
FIG. 6 is a schematic showing a microfluidic biofuel cell stack.

In addition, multiple microfluidic biofuel cells of the invention can be joined in a series electrical circuit to form a biofuel cell stack. See FIG. 6. A series stack is formed by electrically joining the bioanode (41) of one biofuel cell to the biocathode (40) of another biofuel cell, which is in turn connected to another bioanode (41) until the desired stack is obtained. Fuel fluid and/or oxidant flows into the microfluidic chamber in an entry reservoir (33). By forming stacks, the total voltage output of a microfluidic biofuel cell circuit is theoretically the sum of the voltage output from the individual microfluidic biofuel cells in series. The greater overall voltage output of such a stack is useful in supplying electricity to electronic devices, toys, medical devices, and vehicles with power requirements higher than an individual microfluidic biofuel cell could provide.

Definitions

As used herein, a "fuel cell" comprises an anode and a cathode, which are separated to avoid an electrical short. A biofuel cell utilizes a fuel fluid and an enzyme which catalyzes an oxidation of the fuel fluid. In one embodiment, a "biofuel cell" utilizes organic fuels as a source of energy and redox enzymes to catalyze the oxidation of the organic fuel. The terms "fuel cell" and "biofuel cell" are used interchangeably in throughout the instant disclosure. In one embodiment, the fuel cell of the instant invention may be used in applications that require an electrical supply, such as, but not limited to electronic devices and equipment, toys, internal medical devices, and electrically powered vehicles. In another embodiment, the fuel cell of the instant invention may be implanted into a living organism, wherein the organic fuel is derived from the organism and the fuel cell powers a device implanted in the living organism.

As used herein, the term "microfluidic" refers to the use of microscale channels, i.e., microchannels, for the fuel fluid to flow through during the biofuel cell's operation. These microchannels can be formed in a polymer substrate, using soft lithography.

As used herein, the term "soft lithography" refers to any of the techniques generally known in the art for using a pattern-transfer element, i.e., a stamp, having a three-dimensional structure molded thereon to create the desired pattern on a substrate. Generally, soft lithography utilizes an elastomer, a polymer that deforms under force and regains its original shape after the force is released, as the stamp material. PDMS is a preferred stamp material. Exemplary soft lithography techniques are described in, e.g., U.S. Pat. No. 6,645,432 (Anderson, et al.), U.S. Pat. No. 6,180,239 (Whitesides, et al.), and U.S. Pat. No. 6,143,412 (Schueller, et al.).

As used herein, the term "organic fuel" or "fuel fluid" means any carbon-based compound that has stored energy. Organic fuels include but are not limited to nucleic acids, carbohydrates (such as glucose), alcohols, fatty acids and other hydrocarbons, ketones, aldehydes, amino acids and proteins. The organic fuel may be a biological compound within an organism. Preferred fuels are alcohols, which include methanol, ethanol, butanol, and isopropanol, and carbohydrates, especially glucose or polymers thereof. Preferred alcohols are ethanol and methanol.

The invention is also drawn to a bioanode and a biocathode. A bioanode is an anode comprising an enzyme that catalyzes the oxidation of a fuel fluid. In one embodiment, the term "bioanode" means an anode, which comprises a redox enzyme that catalyzes the oxidation of an organic fuel. An anode provides a source of electrons for an electrical circuit or electrical potential. In one embodiment, the term "biocathode" means a cathode, which comprises a redox enzyme, such as a laccase or oxidase, that catalyzes the reduction of an oxidant.

As used herein, the term "electrocatalyst" refers to a material capable of accepting or donating an electron from a compound. A preferred anodic electrocatalyst is a poly(methylene green), as described in Zhou et al., "The Electrochemical Polymerization of Methylene Green and its Electrocatalysis for the Oxidation of NADH," Analytica Chimica Acta 329 (1996) 41-48. Preferred compounds that are substrates for electrocatalysis by the redox polymer include reduced adenine dinucleotides, such as NADH, $FADH_2$ and NADPH. Redox polymer films useful for biocathodes include poly(N-vinyl-imidiazole) and derivatives thereof.

As used herein, the term "enzyme immobilization material" refers to a material capable of allowing for the conduction of ions through it while immobilizing and stabilizing an enzyme. A preferred enzyme immobilization material is a perfluorinated ion exchange polymer, such as Nafion® (DuPont, Wilmington, Del.). The invention is also drawn to a modified enzyme immobilization material, which includes quaternary ammonium ions at the sulfonic acid exchange sites. The modification results in a neutral pH within the micelles of the enzyme immobilization material. According to the present invention, one or more enzymes are incorporated or trapped within the micelles of the salt-extracted quaternary ammonium treated perfluorinated ion exchange polymer.

As used herein, the term "ion exchange polymer" or "ion exchange polymer membrane" refers to a polymer capable of allowing for the conduction of ions through it. A preferred ion exchange polymer is a perfluorinated ion exchange polymer, such as Nafion® (DuPont, Wilmington, Del.). The invention is also drawn to a perfluorinated ion exchange polymer, which comprises a modification, which includes quaternary ammonium ions at the sulfonic acid exchange sites. The modification results in a neutral pH within the micelles of the ion exchange polymer. According to the present invention, one or more redox enzymes are incorporated or trapped within the micelles (or "micellar compartment") of the salt-extracted quaternary ammonium treated perfluorinated ion exchange polymer.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters and ethers.

The term "heteroatom" shall mean atoms other than carbon and hydrogen.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

The following examples illustrate the invention.

EXAMPLE 1

Forming an Electrode

Replica molding was used to form a pattern for a microchannel of the desired electrode dimensions in a PDMS casting mold. Here, the pattern was about 10-70 μm wide, about 2-4 cm long, and about 5-75 μm deep. Also, two reservoirs were formed in the PDMS casting mold, one at each end of the length of the microchannel pattern. See FIG. 3a. These reservoirs served as the entry reservoir and the vent for future operations. The PDMS casting mold was then sealed to a glass substrate with the microchannel pattern facing the substrate. The substrate also included a tubing connector, placed adjacent one end of the casting mold. This tubing connector served to deliver the electron conductor solution and other solutions into the microchannels during subsequent processing. The microchannel was then primed with about 0.5 mL of Ercon N160 Solvent Thinner and filled with a carbon electrode solution of about 0.1 g of Ercon E-978(I) Carbon-based ink by flowing the solution into the reservoir. See FIG. 3b. Once the microchannel was filled, it was cured for 1 hour at 75° C., after which the PDMS was removed. The cured ink that was in the reservoirs was removed as well, and the remaining solvent was evaporated and ink was cured by heating for about 1 hour at about 120° C. See FIG. 3c. These heating processes produce the electron conductor of the electrode.

After the electron conductor was formed, a PDMS microfluidic channel form was sealed over the microelectrode. This form had a pattern in its surface that was created using replica molding. The pattern of this form was about 75-250 μm wide, about 2-5 cm long, and about 50-200 μm deep. Also, two reservoirs were formed in the PDMS casting mold, one at each end of the length of the microchannel pattern. These reservoirs served as the entry reservoir and the vent for future operations, including flowing other electrode components over the electron conductor. See FIG. 3d. After the electron conductor was formed, a solution containing the enzyme immobilization material was syringe pumped through the microfluidic channel form and allowed to cure for about 8-10 hours.

EXAMPLE 1A

Microelectrode Preparation

Masters for the production of PDMS micromolding channels were made by coating a 4-in. silicon wafer with SU-8 10 negative photoresist using a spin coater (Brewer Science, Rolla, Mo.) operating with a spin program of 1000 rpm for 30 seconds for micromolding channel. For flow channels, a spin program of 1750 rpm for 30 seconds was used with SU-8 50 negative photoresist. The photoresist was prebaked at 90° C. for 5 minutes prior to UV exposure for 4 minutes with a near-UV flood source (Autoflood 1000, Optical Associates, Milpitas, Calif.) through a negative film containing the micromolding channel or flow channel design structures (Jostens, Topeka, Kans.). The transparency was made from a computer design drawn in Freehand (PC Version 8.0, Macromedia Inc., San Francisco, Calif.). The design was transferred to a transparency using an image setter with a resolution of 2400 dpi by a printing service (Jostens, Topeka, Kans.). Following this exposure, the wafer was postbaked at 90° C. for 5 minutes and developed in Nano SU-8 developer. The wafers containing the desired design were rinsed with acetone and isopropanol in order to remove any excess, unexposed photoresist that may have remained on the silicon wafer. The thickness of the photoresist was measured with a profilometer (Alpha Step-200, Tencor Instruments, Mountain View, Calif.), which corresponded to the channel depth of the PDMS structures.

A degassed 10:1 mixture of Sylgard 184 elastomer and curing agent were then poured onto the silicon wafer and cured at 75° C. for approximately 2 hrs. The PDMS was removed from the master wafer by cutting around the edges and peeling back the PDMS from the wafer. The master could be reused in order to generate numerous copies of the PDMS channels. The resulting PDMS flow channel was 200 mm wide, 100 mm deep and 3.0 cm long.

Soda-lime glass plates were purchased from a local glass shop. The plates were 7 cm wide, 10 cm long and 1.54 mm thick. The glass plates were cleaned by soaking them for 15 minutes in piranha solution (70% concentrated $H_2SO_4$/30% $H_2O_2$) to remove organic impurities. Glass was then rinsed thoroughly with Nanopure (18 MΩ-cm) water and dried with nitrogen. Using traditional lithographic and sputtering procedures, palladium electrodes were fabricated on the glass in specific patterns. Each plate could hold several flow channels with electrodes. This was more specifically accomplished by argon ion sputtering of a layer of titanium, for adhesive properties, and a layer of palladium. In order to accomplish this, the glass was placed into a deposition system (Thin Film Deposition System, Kurt J. Lesker Co.) for deposits of the metals. The thickness of the metals was monitored using a quartz crystal deposition monitor (Inficon XTM/2, Leybold Inficon). Titanium was deposited from a Ti-target at a rate of ~2.3 angstroms/s to a depth of 200 angstroms. Palladium was deposited from a Pd-target at a rate of ~1.9 angstroms/s to a depth of 2000 angstroms. AZ 1518 positive photoresist was dynamically dispensed onto the palladium coated glass. A pre-exposure bake at 95° C. for 1 minute was followed by a 9 second ultra-violet exposure through a positive film. The film was removed and the glass placed in a commercially available developer (AZ 300 MIF developer) for 45 seconds. After rinsing with water and drying with nitrogen, the glass was post baked for 1 minute at 95° C. Wet etching was employed using Aqua regia (8:7:1 $H_2O:HCl:HNO_3$) to remove the unwanted palladium and a titanium etchant to remove unwanted titanium from the glass. Once completed, the glass was rinsed with acetone and isopropanol to remove the remaining photoresist and dried with nitrogen.

A flow access hole was drilled through each glass plate, while immersed under water, with a 1-mm diamond drill bit and a Dremel rotary tool (Dremel). The syringe connector portion of a leur adapter was removed with the Dremel rotary tool and accompanying cutting disc. After polishing with a sanding disc, the leur adapter was affixed to the glass plate with J.B. Weld. The epoxy was cured in an oven (75° C.) for 2 hours before use. Connections were made to the palladium electrodes by copper wire and colloidal silver.

Figure 8B:
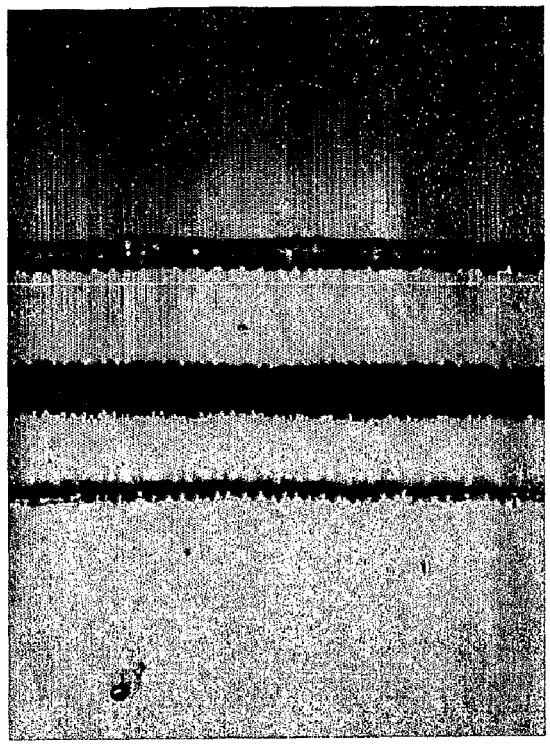
FIGS. 8(a)-(b) are micrographs of a carbon ink microelectrode as prepared in Example 1A.
Figure 8A:
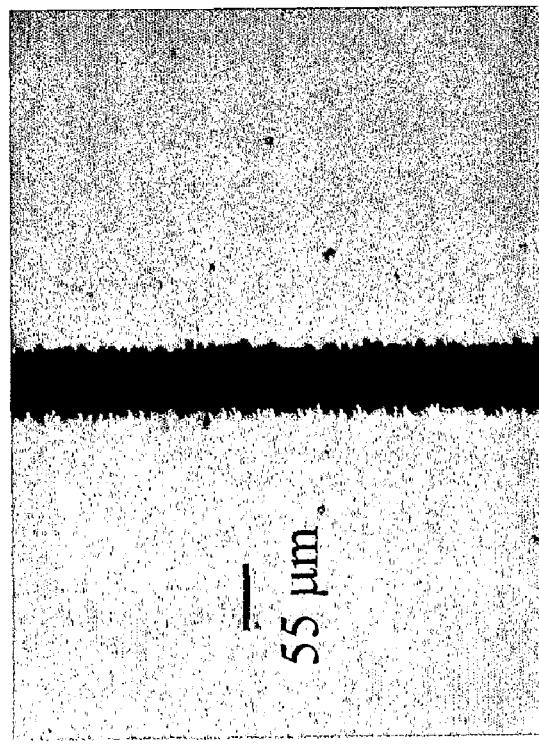

To fabricate carbon ink microelectrodes, first the PDMS micromolding channel was sealed to the glass plate in contact with the palladium leads (with leur fitting attached) that had been thoroughly cleaned. The PDMS channels were first primed with solvent thinner (N-160). The thinner was removed by applying a vacuum to one of the reservoirs. As soon as the thinner had been removed, a mixture of commercially available carbon ink and solvent thinner was added to the channels and pulled through the channel by applying vacuum (via water aspirator) to the opposite end. The ink/thinner mixture was made so that the volume of added thinner was 0.2% (v/w) of the initial ink weight. After filling channels with carbon ink, the reservoir where vacuum had been applied was filled with the ink/thinner solution and the entire chip placed in an oven at 75° C. for one hour. After this period of time, the PDMS could be removed from the glass, leaving the carbon microelectrode attached to the glass surface. A final curing/conditioning step was achieved by placing the chip in a separate oven at 12° C. for one hour. The steps involved with micromolding of carbon inks is shown in FIG. 3. The height of the carbon microelectrode was measured with a profilometer and the width was measured via microscopy. Micrographs of a carbon ink microelectrode are represented in FIGS. 8a and 8b.

In order to further characterize the carbon ink electrodes, cyclic voltammetry was employed and performed in a 3-electrode format using a CH Instruments 810 bipotentiostat (Austin, Tex.). The carbon microelectrode was the working electrode with a silver/silver chloride reference electrode and a platinum wire as the auxiliary electrode. A static cell for cyclic voltammetry experiments was created in a piece of PDMS by cutting a small section (1 cm×2 cm) out of a larger piece of PDMS (2 cm×3 cm); this piece of PDMS was then sealed over the carbon electrode so the entire length of the electrode was exposed to solution. For flow experiments, a PDMS microchannel (~200 mm wide, 100 mm deep and ~2 cm long) was sealed over the carbon electrode, so the entire electrode was sealed inside the microchannel as depicted in FIGS. 8b and 9. The auxiliary and reference electrodes were contained in the outlet reservoir by use of an electrochemical cell holder (CH Instruments).

The carbon working electrodes are electropolymerized with methylene green. Methylene green is a well-known electrocatalyst for NADH. The thin film of poly(methylene green) was formed by performing cyclic voltammetry using a CH Instruments Model 810 potentiostat (Austin, Tex.) from –0.3 V to 1.3 V for 7 scans cycles at a scan rate of 0.05 V/s in a solution containing 0.4 mM methylene green and 0.1 M sodium nitrate in 10 mM sodium borate. A piece of PDMS was used to define the electrochemical cell over the entire carbon electrode. A calomel reference electrode with a platinum wire auxiliary electrode completed the electrochemical cell. The electrode was rinsed and then allowed to dry overnight before further modification.

The flow access hole drilled in the glass plate allowed for access to flow from a syringe pump (Pump 11, Harvard Apparatus, Holliston, Mass.). A syringe was filled with the solution of choice and placed in the syringe pump. With the use of high pressure fittings, leur adapters, and Teflon PEEK tubing, the syringe was connected to the glass microchip. The flow rates were varied from 0 μL/min to 15 μL/min through the 200 μm-wide PDMS flow channel which was aligned with one end at the flow access hole. The channel was sealed directly over the electrode. At the other end of the channel, a reservoir was formed by a hole punch and was where the cathode or reference and counter electrodes were placed.

Figure 10:
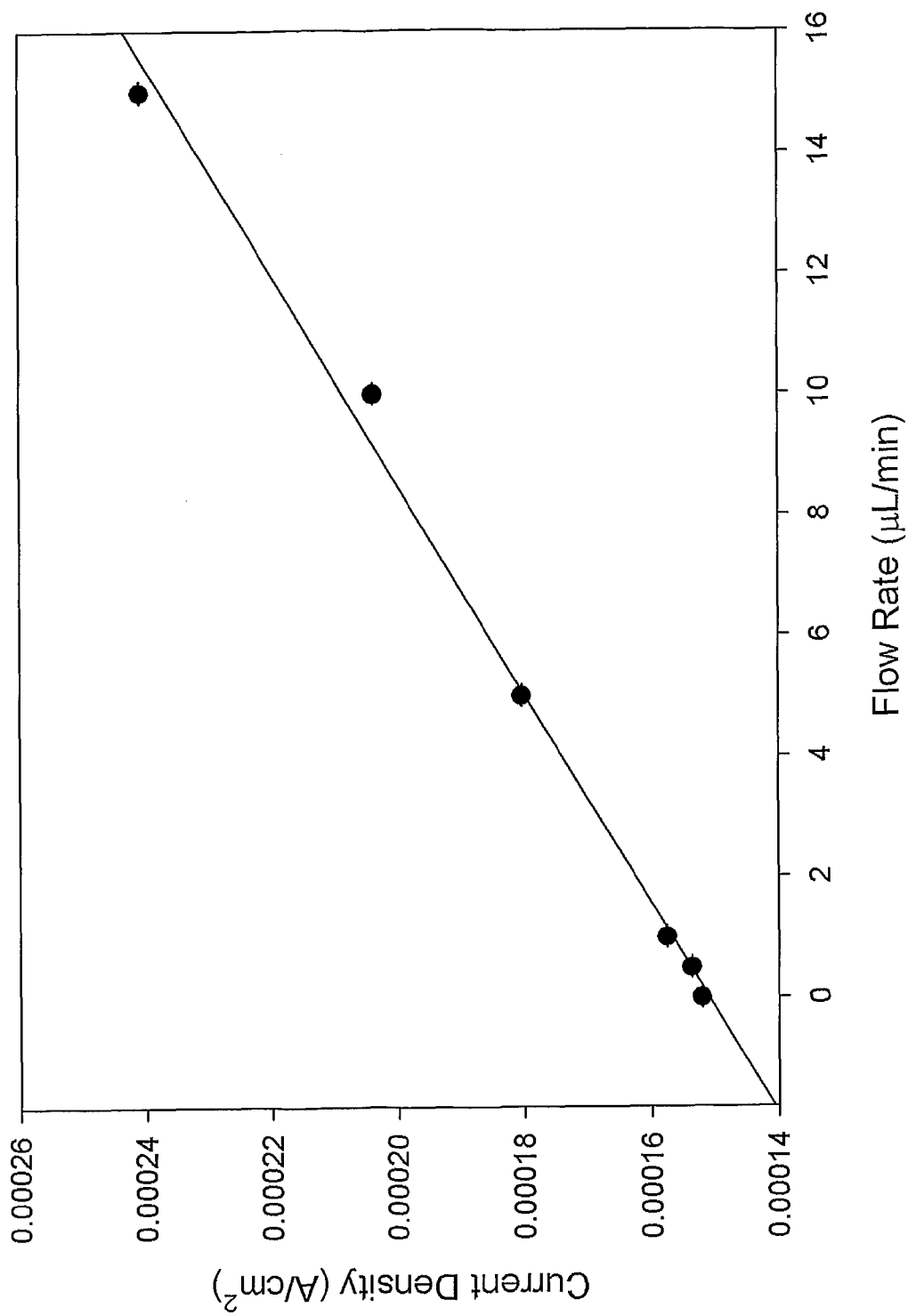
FIG. 10 is a graph of current densities for a carbon ink microelectrode as a function of flow rate of 1 mM tris(2,2'-bipyridyl)dichlororuthenium(II) hexahydrate and 0.1 M sodium sulfate as electrolyte.

The carbon ink electrode generally was a 2.5 cm long electrode that was 55 μm wide and 87 μm high. A solution of 1 mM tris(2,2'-bipyridyl)dichlororuthenium(II) hexahydrate and 0.1M sodium sulfate as the electrolyte was used to characterize the response of the electrode using cyclic voltammetry. A current density of $3.38 \times 10^{-4} \pm 3.37 \times 10^{-5}$ A/cm$^2$ was obtained for a carbon ink electrode in a static solution. This compares to $2.06 \times 10^{-4} \pm 1.11 \times 10^{-5}$ A/cm$^2$ for a conventional glassy carbon microelectrode. A microelectrode sealed within a 200 μm wide channel was studied at various flow rates with 1 mM tris(2,2'-bipyridyl)dichlororuthenium(II) hexahydrate and 0.1 M sodium sulfate solution. Current densities are recorded in FIG. 10. As flow rate was increased, the current density increased which is expected due to the analyte reaching the electrode surface faster with an increase in flow rates. Initially, an electrochemical pretreatment was utilized to clean the electrode by applying 1.5 V for 3 minutes in a 0.05 M phosphate buffer (pH 7.4). However, the pretreatment showed little effect on the cyclic voltammograms when compared to non-treated electrodes and therefore would not be continued for further studies.

Methylene green was successfully immobilized onto the carbon microelectrodes using 14 scan segments from −0.3 V to 1.3 V, the same procedure employed for macro-scale carbon electrodes. The polymerization voltammograms resembled those obtained with macro-sized carbon electrodes. NADH was used to measure the electrocatalytic nature of the poly(methylene green) coated carbon ink electrode. Under static conditions, a current density of $1.29 \times 10^{-4} \pm 4.62 \times 10^{-5}$ A/cm$^2$ was obtained. Further studies used hydrodynamic flow conditions at various flow rates to pump the analyte solution to the electrode surface through PDMS flow channels. Using commercially available microfittings, flow rates up to 20 mL/min have been pumped through 3 cm by 240 mm by 100 mm PDMS channels that are reversibly sealed over the carbon microelctrode. NADH was pumped through the PDMS flow channels at various flow rates of 0.5 mL/min to 15.0 mL/min. Current densities for these conditions are presented in Table 1.1 and for a planar disc glassy carbon flow cell (diameter=3 mm) and are independent of flow rate. These results are not what would be normally expected for this system. Electron transfer between the NADH and the poly(methylene green) modified carbon ink electrode possibly could be causing this deviation from what would be expected which is an increase in current density with an increase in flow rate.

TABLE 1.1

| Flow Rate (μL/min) | Current densities (A/cm$^2$) Planar disc electrode flowcell | Current densities (A/cm$^2$) Carbon microelectrodes |
| --- | --- | --- |
| 0.5 | $5.92 \times 10^{-5}$ | $5.47 \times 10^{-5}$ |
| 1 | $5.89 \times 10^{-5}$ | $5.32 \times 10^{-5}$ |
| 5 | $5.72 \times 10^{-5}$ | $5.28 \times 10^{-5}$ |
| 10 | $5.63 \times 10^{-5}$ | $5.63 \times 10^{-5}$ |
| 15 | $5.53 \times 10^{-5}$ | $5.50 \times 10^{-5}$ |

EXAMPLE 2

Creating Electrode with EIM in Electron Conductor Solution

The procedure of Example 1 was followed with slight modification to simplify the process of forming an electrode comprising an electron conductor and an enzyme immobilization material. To do so, the electron conductor solution was modified to include the enzyme immobilization material. The additional material was prepared by adding 0.0003 moles of TBAB to 1 mL of Nafion in a weigh boat and allowing the mixture to air dry. After drying, water was added to rinse the mixture, and the mixture was allowed to air dry overnight. Next, the mixture was rinsed two more times with water and allowed to air dry. Then the material was suspended in 1 mL of Ercon N160 Solvent Thinner and vortexed thoroughly. Finally, 1 mL of this modified thinner was added to 0.5 g Ercon E-978(I) carbon-based ink. This modified electron conductor solution was then flowed through the mold cavity formed by the casting mold and the substrate and cured according to the method described in Example 1.

EXAMPLE 3

Forming an Anode

To form a bioanode according to the invention, the general steps of Example 1 were used, with the anode being completed by flowing additional materials over the electron conductor after its curing and activation stages. To start, a solution of methylene green was made by syringe pumping across electron conductor. The solution was then electropolymerized for fourteen scan segments from −0.3 V to 1.3 V at a scan rate of 50 mV/s.

Next, a casting solution of the remaining anode elements was created by combining about 100 mL of TBAB, about 200 mL of ADH, and about 5 mg of NAD$^+$ in lower aliphatic alcohol. This solution was then vortexed together thoroughly and pumped through the approximately 100 mm microchannel at a flow rate of about 1 mL/min. The electron conductor and the casting solution were then allowed to dry overnight.

EXAMPLE 3A

Microbioanode Preparation

The microchips and channel masters were fabricated as described in Example 1A using photolithography. The carbon ink microelectrodes generated from the micromolding procedure could be further modified with the tetrabutylammonium bromide/Nafion® membrane mixture described in the specification.

The carbon microelectrodes were modified to serve as a bioanode. A hole was punched in PDMS to form a bulk reservoir that was placed around the microelectrode and include Ag/AgCl reference electrode and a platinum wire as the auxiliary electrode. Specifically, this was a static cell. A solution of 0.4 mM methylene green and 0.1 M sodium nitrate in 10 mM sodium borate was pipetted into the PDMS reservoir. Polymerization of methylene green via cyclic voltammetry was performed using a CH Instruments 650 potentiostat (Austin, Tex.) from −0.3V to 1.3V for 14 scan segments at a scan rate of 50 mV/s. The methylene green solution was pipetted out of the reservoir and the PDMS removed. The poly(methylene green) modified carbon ink microelectrodes were then rinsed with 18MΩ (Nanopure) water and allowed to dry overnight.

The alcohol dehydrogenase/Nafion® mixture was immobilized onto the carbon microelectrode using microchannels that were reversibly sealed over the microelectrodes and hydrodynamic flow. The size of this flow channel was such that alignment over the microelectrode was possible but was not much wider than the electrode. To accomplish this, a PDMS microchannel (130 mm wide, 100 mm deep and ~2 cm long) was sealed over the carbon electrode (~40 mm wide, ~2 cm long, and ~100 mm high), so that the entire electrode was sealed inside the microchannel. A 2:1 ratio of alcohol dehydrogenase (ADH) and tetrabutylammonium bromide modified Nafion® mixture with 1 mg of $NAD^+$ for each 20 mL of tetrabutylammonium bromide modified Nafion® was prepared and vortexed until sufficiently mixed. The mixture was introduced to the channels thru a syringe by use of a syringe pump (Harvard Apparatus, Brookfield, Ohio) at 1.0 mL/min. Once the mixture had traveled the entire length of the channel (monitored visually), the solvent was allowed to evaporate at room temperature. This is possible since PDMS is permeable to gases. After evaporation was complete, the PDMS was removed, leaving a coated bioanode.

EXAMPLE 4

Forming a Biocathode

To form a biocathode according to the invention, the general steps of Example 1 were used, with the biocathode being completed by flowing additional materials over the electron conductor after its curing and activation stages.

To modify the electron conductor, a casting solution of about 1 mg of bilirubin, about 1 mg of bilirubin oxidase, and about 100 mL TBAB was vortexed together for about 20 minutes. Next, the solution was pumped through the approximately 100 mm microchannel at a flow rate of about 1 mL/min. The electron conductor and the casting solution were then allowed to dry overnight. Once dried, the electrode was soaked in a solution of about 1 mM $Ru(bpy)_3^{+2}$ and about 0.1M sodium sulfate for about 24 hours.

EXAMPLE 4A

Microbiocathode

The biocathode was created in a similar fashion to the bioanode of Example 3A. A PDMS microchannel was sealed over a carbon ink microelectrode. Tetrabutylammonium bromide modified Nafion® was mixed with bilirubin and bilirubin oxidase. The mixture was then pumped through the channel at a 1.0 mL/min until it reached the end of the channel after which time the solvent was allowed to evaporate. Tris(2,2'-bipyridyl)dichlororuthenium(II) hexahydrate was exchanged within the membrane by flowing a 1.0 mM solution of it at a flow rate of 0.5 mL/min for 5 hours. Afterwards the PDMS flow channel was removed leaving a coated electrode that was used as a biocathode.

EXAMPLE 5

Fuel Cell with a Biocathode and an External Anode

To form a functional biofuel cell in accord with this invention, the biocathode constructed in Example 4 was combined with an external anode.

EXAMPLE 6

Fuel Cell with a Bioanode and an External Cathode

To form a functional biofuel cell in accord with this invention, the bioanode constructed in Example 3 was combined with an external cathode.

EXAMPLE 7

Fuel Cell with the Biocathode and Bioanode in Separate Microchannels

To form a functional biofuel cell in accord with this invention, the bioanode constructed in Example 3 was combined with the biocathode constructed in Example 4. To do so, the bioanode and biocathode were formed on the same substrate, generally in parallel to one another, and approximately 100 μm-1 cm apart. A passage was then created between their respective PDMS microfluidic channel forms by removing material such that the channels were exposed to one another. See FIG. 5. To reseal the biofuel cell and prevent any leakage of fuel fluid or oxidant, a thin layer of PDMS was laid over the PDMS microfluidic channel forms.

EXAMPLE 8

Fuel Cell with Bioanode and Biocathode in Same Microchannel

Figure 7:
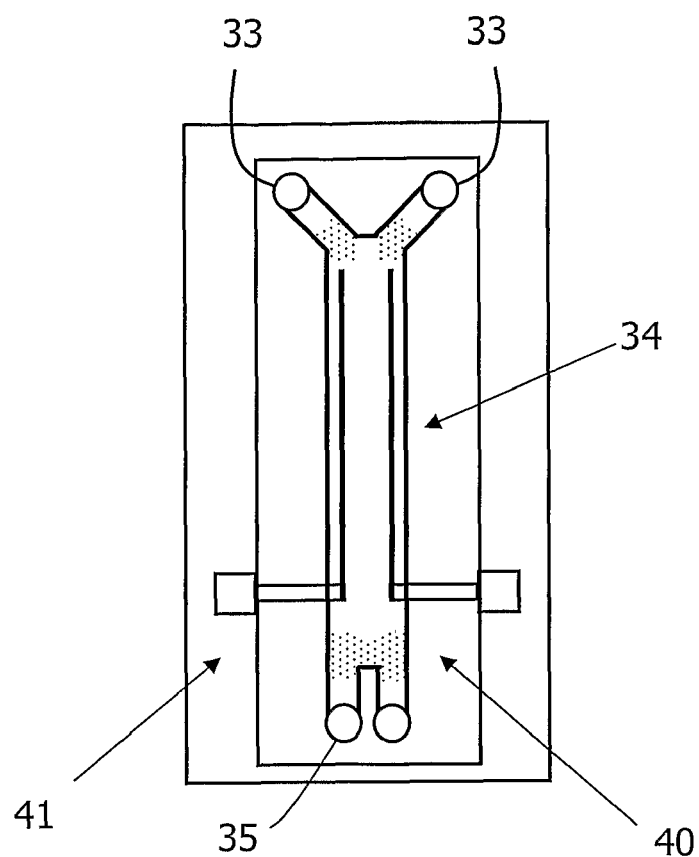
FIG. 7 is a schematic showing a microfluidic biofuel cell with a single microfluidic channel.

With reference to FIG. 7, to form a functional biofuel cell in accord with this invention, the bioanode constructed in Example 3 was combined with the biocathode constructed in Example 4. To do so, the bioanode and biocathode were formed on the same substrate, generally in parallel to one another, and approximately 100 μm-1 cm apart. The mold overlaying both the bioanode and the biocathode was then removed. A microfluidic channel form having a single channel (34) encompassing both the bioanode (41) and the biocathode (40) was then applied to the substrate over both the bioanode and the biocathode. Fuel fluid and/or oxidant enters the channel by an entry reservoir (33) and exits the channel by an exit vent (35).

EXAMPLE 9

Fuel Cell Stack

To form a biofuel cell stack in accord with this invention, several biofuel cells were constructed according to Example 7 on the same substrate, generally in parallel to one another. External electrical connectors were then used to electrically connect the biocathode of the first biofuel cell with the bioanode of the second biofuel cell. The biocathode of the second biofuel cell was then electrically connected to the bioanode of the third biofuel cell. This pattern was repeated until all of the individual biofuel cells were electrically joined into a biofuel cell stack. This biofuel cell stack produced current approximately equivalent to the sum of the individual biofuel cells capability.

EXAMPLE 10

Bioanode and Biocathode Embodiments

All modified electrodes were equilibrated in pH 7.15 phosphate buffer before electrochemical measurements were performed. The working electrodes were carbon ink microelectrodes modified as bioanodes or biocathodes. The reference electrode was a Ag/AgCl electrode and a platinum wire acted as the auxiliary or counter electrode. The bioanodes were studied by cyclic voltammetry from −0.5V to 1.3V in a 1.0 mM ethanol and 1.0 mM $NAD^+$ solution in phosphate buffer (pH 7.15). Biocathodes were studied in pH 7.15 phosphate buffer using cyclic voltammetry. The potential was scanned from 0.2V to 1.9V. Peak currents were recorded for each electrode in both a static system (defined by a reservoir in PDMS) and in a flow system (using 200 mm wide channels defined in PDMS).

Four commercially available carbon inks typically used in a screen-printing process were first tested for their use in the microchip-based biofuel cell. The carbon ink microelectrodes were polymerized with methylene green. A mixture of alcohol dehydrogenase and tetrabutylammonium bromide modified Nafion® was coated on the electrode through a 100 mm wide PDMS channel. The channel was removed after all the solvent had evaporated and replaced with a PDMS channel that was 200 mm wide. Cyclic voltammetry was employed and a 1 mM ethanol and 1 mM $NAD^+$ fuel solution in pH 7.15 phosphate buffer was pumped through the channel at 1.0 mL/min. Peak currents were recorded and current densities calculated for each type of ink employed and the results are presented in Table 10.1. The Ercon E-978(I) carbon ink demonstrated the highest current densities and was used for further studies. Current densities for bioanodes were determined for a variety of flow rates and in a static system. The current density does not vary with flow rate. This is typical of modified electrodes especially those where the modification layer is a thick film because the diffusion through the film is limited. The current densities measured for the static system are not statistically different from those obtained for the flow system. Maximum current density obtained for the microelectrode bioanodes was 3.26 $mA/cm^2$ which is comparable to macroscale bioanodes.

TABLE 10.1

| Flow Rate (µL/min) | Ercon E-978(I) Carbon ink | Ercon G-451(I) Graphite ink | Acheson Electrodag PF-407C | Acheson Electrodag 440B(49AB90) |
|---|---|---|---|---|
| 0.5 | $1.77 \times 10^{-3} \pm 9.06 \times 10^{-4}$ | $1.00 \times 10^{-4} \pm 2.19 \times 10^{-5}$ | $1.03 \times 10^{-4} \pm 1.82 \times 10^{-5}$ | $4.70 \times 10^{-5} \pm 2.07 \times 10^{-6}$ |
| 1 | $1.92 \times 10^{-3} \pm 9.70 \times 10^{-4}$ | $1.01 \times 10^{-4} \pm 2.18 \times 10^{-5}$ | $1.01 \times 10^{-4} \pm 1.96 \times 10^{-5}$ | $4.73 \times 10^{-5} \pm 6.92 \times 10^{-6}$ |
| 5 | $1.90 \times 10^{-3} \pm 8.58 \times 10^{-4}$ | $1.07 \times 10^{-4} \pm 3.77 \times 10^{-5}$ | $1.06 \times 10^{-4} \pm 1.27 \times 10^{-5}$ | $4.27 \times 10^{-5} \pm 6.59 \times 10^{-6}$ |
| 10 | $1.91 \times 10^{-3} \pm 8.41 \times 10^{-4}$ | $9.69 \times 10^{-4} \pm 8.16 \times 10^{-6}$ | $1.05 \times 10^{-4} \pm 1.63 \times 10^{-5}$ | $4.07 \times 10^{-5} \pm 4.44 \times 10^{-6}$ |
| 15 | $1.96 \times 10^{-3} \pm 7.79 \times 10^{-4}$ | $9.80 \times 10^{-4} \pm 2.44 \times 10^{-5}$ | $1.13 \times 10^{-4} \pm 2.97 \times 10^{-5}$ | $3.83 \times 10^{-5} \pm 4.16 \times 10^{-6}$ |

Figure 11:
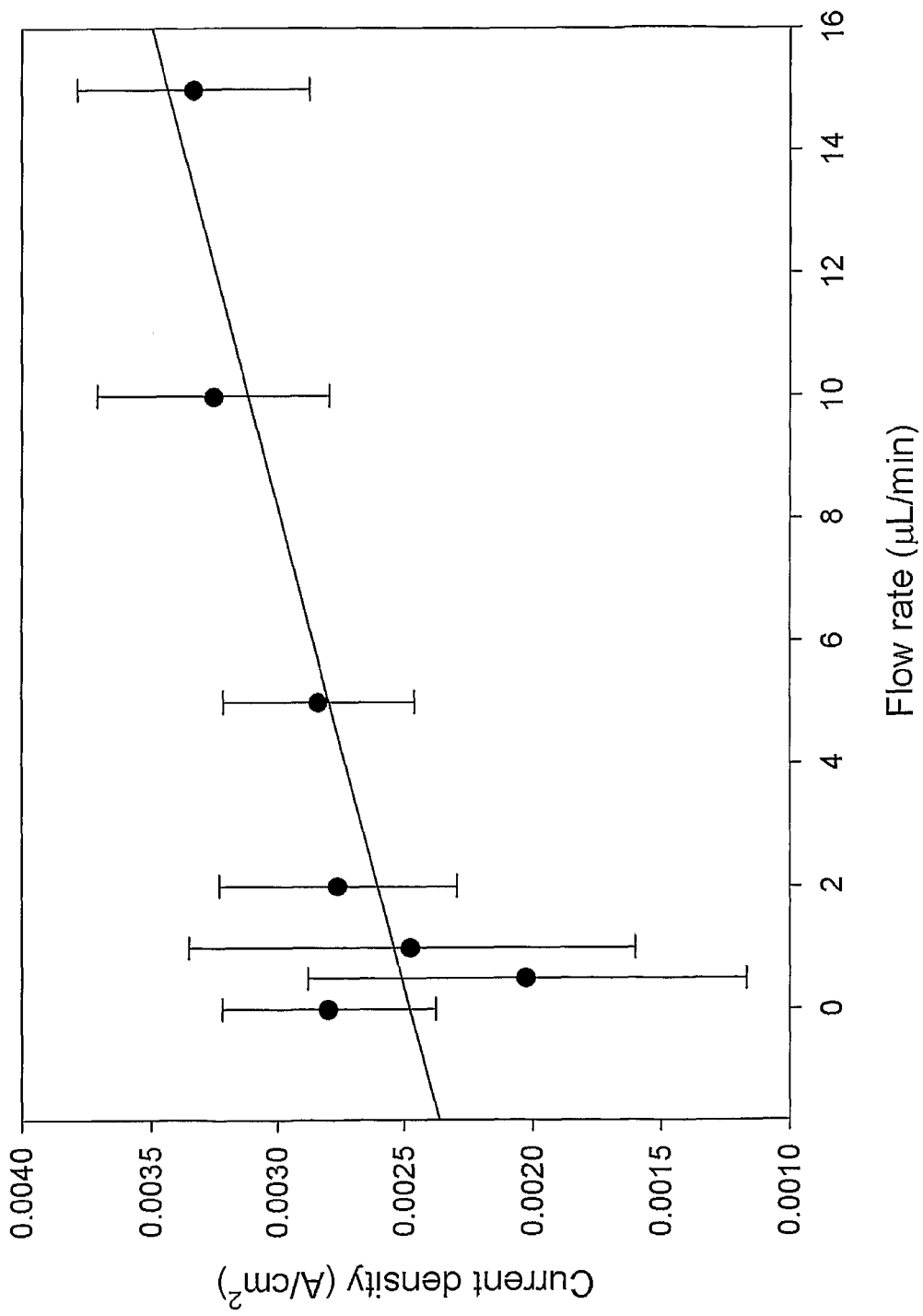
FIG. 11 is a graph of current density as a function of flow rate for biocathodes in phosphate buffer (pH 7.15) at a scan rate of 50 mV/s.

The biocathode employs oxygen as the fuel. Electrons from the anode react at the electrode and reduce $Ru(bpy)_3^{+3}$ to $Ru(bpy)_3^{+2}$ which then proceeds to react with biliverdin to produce bilirubin and reform $Ru(bpy)_3^{+3}$. The bilirubin can react with bilirubin oxidase and oxygen from air to reproduce biliverdin and the byproduct, water. This process is demonstrated in FIG. 1. The cathodes were fabricated and studied by cyclic voltammetry by flowing phosphate buffer (pH 7.15) at a flow rate of 1.0 mL/min through a 200 mm wide PDMS channel. At a scan rate of 50 mV/s, a current density of 100 $mA/cm^2$ was obtained for a static system. Although there is not a statistical difference between their values, when a flow system is employed, the current density increases with increasing flow rates as demonstrated in FIG. 11. The current densities measured for the microfluidic system are lower than the static system probably due to leaching of $Ru(bpy)_3^{+3}$ out of the membrane. The biocathode performs better than the bioanode because the diffusion of oxygen is much faster than other analytes especially those in solution. Maximum current densities for the microscale biocathodes were 101 $mA/cm^2$ compared to the macroscale biocathodes which produced current densities of only 5.82 $mA/cm^2$. Due to the extremely fast diffusion of oxygen in comparison with most other non-gaseous analytes, the anode will be further optimized and those parameters will be employed for the biocathode as well.

Figure 12:
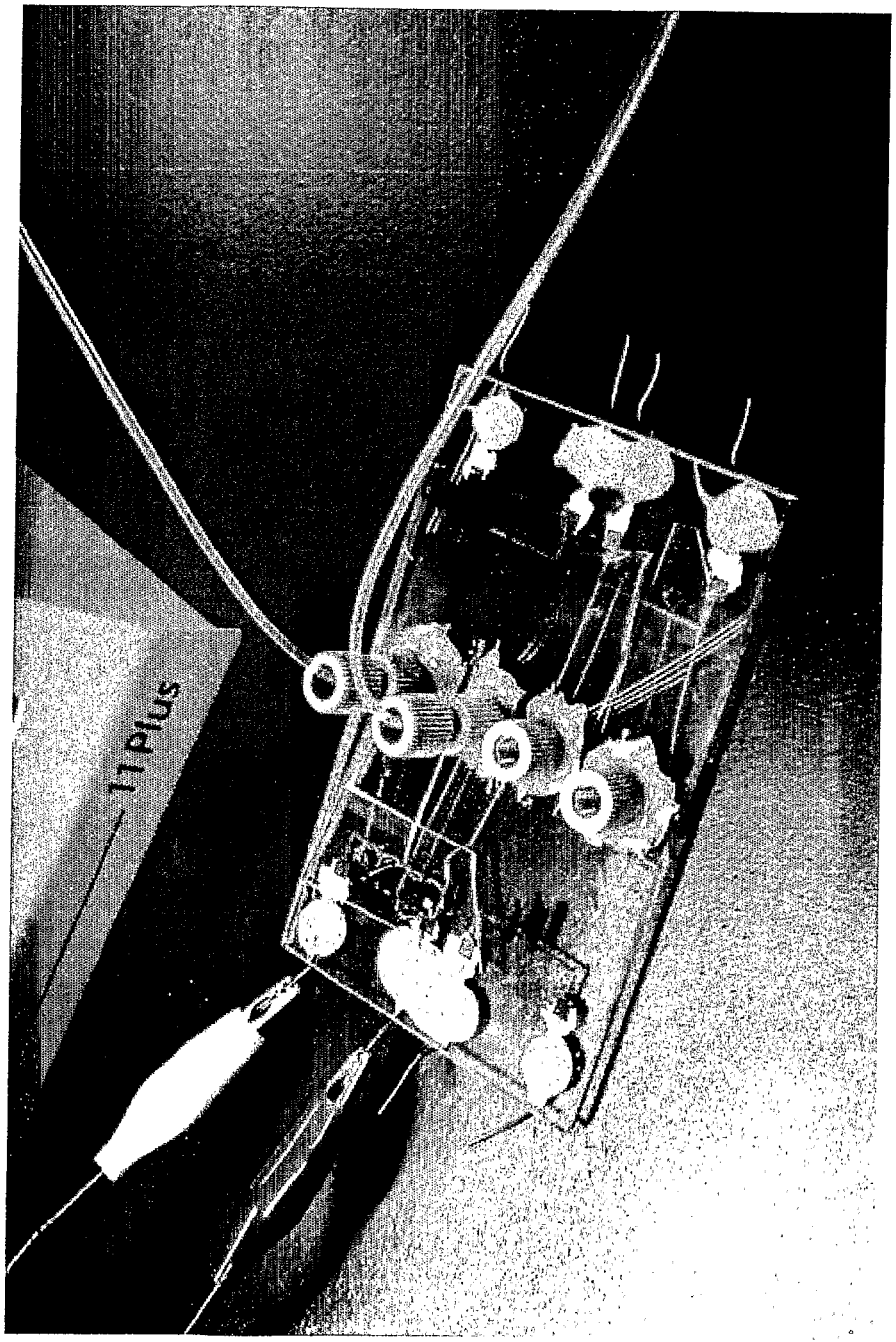
FIG. 12 is a photograph of a fully integrated biofuel cell on a microchip.

Once both the bioanode and biocathode were separately implemented on a chip by modifying carbon ink microelectrodes and sealing them within PDMS channels, a complete biofuel cell was attempted. The first version of the biofuel cell consisted of two separate carbon ink electrodes side by side and sealed within two channels on the same piece of PDMS, with a connecting reservoir at the end of the channels as depicted in FIG. 5. One variation to this set-up is presented in FIG. 12 where the flow outlet is not in the PDMS but rather a hole drilled into the glass which leads the solution to a reservoir on the backside of the chip. Problems existed with both arrangements. The $Ru(bpy)_3^{2+}$ or bilirubin involved in the biocathode would diffuse out or become absorbed to the PDMS or glass and be washed off with flow. This contaminated the membrane, coating the anode leading to decreasing open circuit potentials. The high resistivity of the carbon ink electrodes placed a load on the system itself leading to low open circuit potentials. The maximum open circuit potential was 0.43 V but decayed quickly. The maximum stable open circuit potential was 0.21V compared to macroscale biofuel cells which produced open circuit potentials of 0.74 V. Because the cell did not achieve a constant open circuit potential, a power curve was not obtained.

Figure 13:
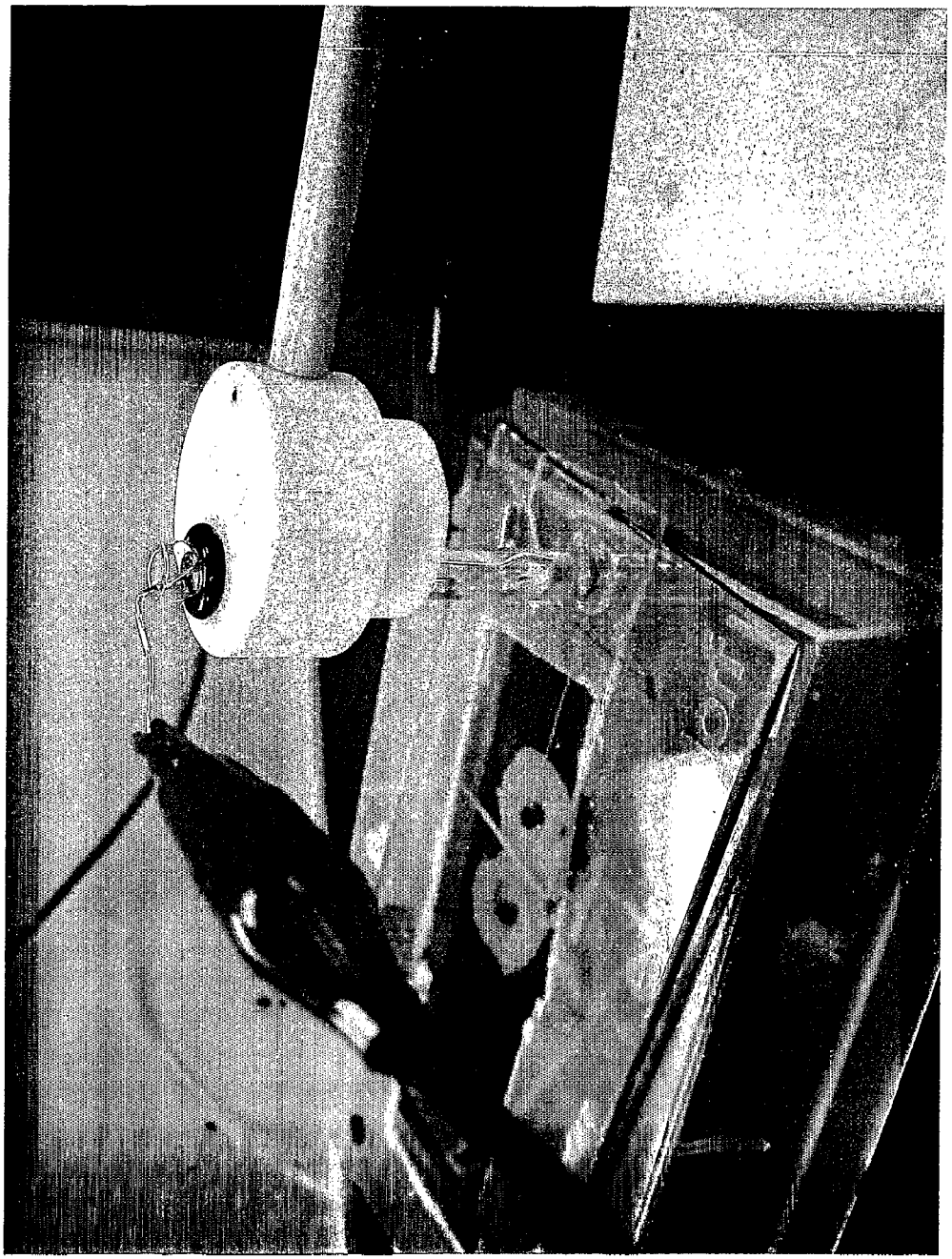
FIG. 13 is a photograph of an integrated microfluidic bioanode with an external cathode. The cathode consists of a platinum wire in a glass tube with Nafion® 117 membrane on one end and in phosphate buffer (pH 7.15).
Figure 14:
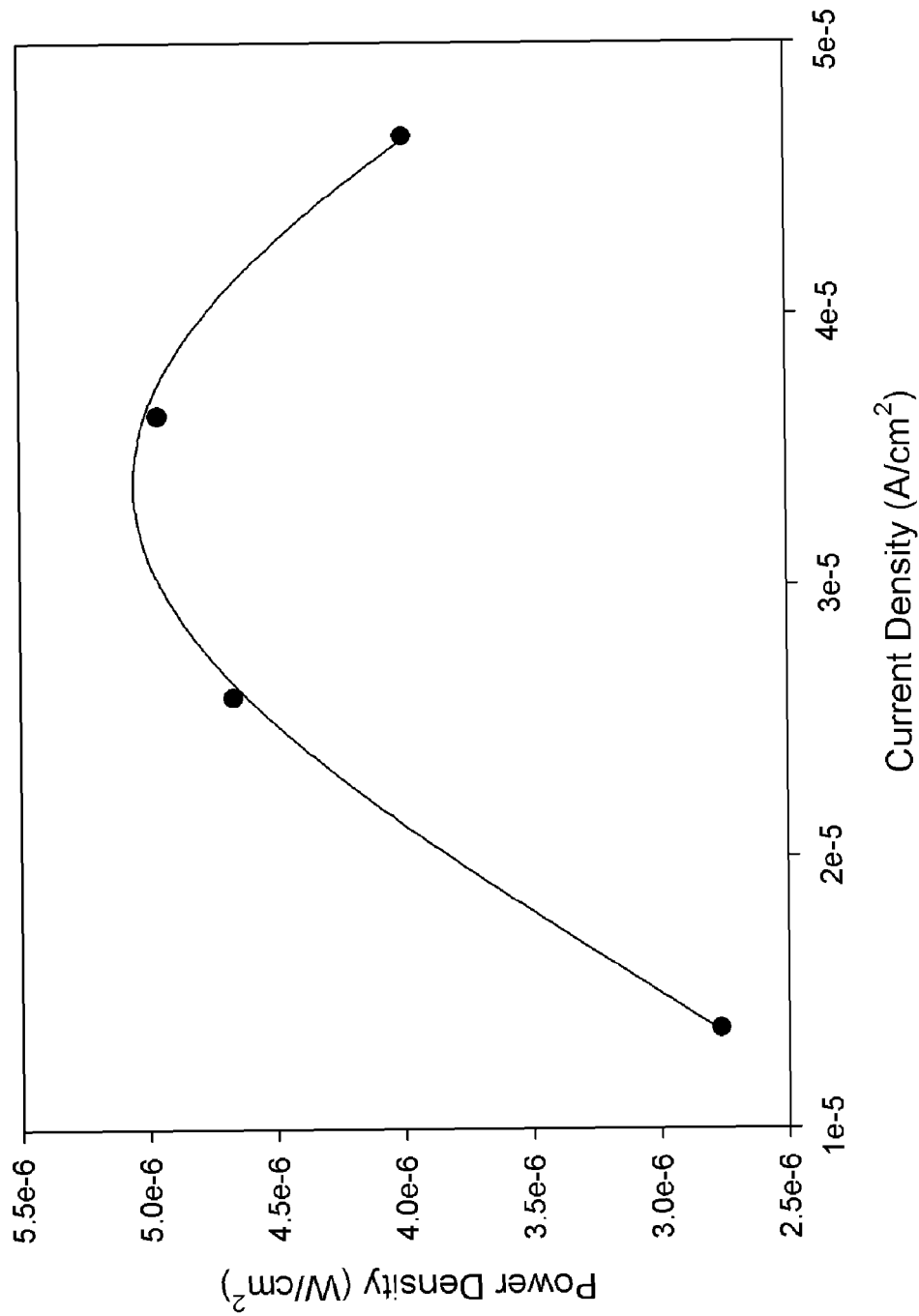
FIG. 14 is a graph of a representative power curve of a microfluidic bioanode with an external platinum wire as a cathode.

In order to alleviate the problem and successfully obtain a power curve for the microfluidic-based cell, an external cathode was developed to be paired with the microfluidic bioanode on the microchip. A piece of glass tubing was cut and a Nafion® 117 membrane was epoxied to the end of it using J. B. Weld. The glass tube could be filled with phosphate buffer (pH 7.15) and a piece of platinum wire was inserted and acted as the cathode. The microchip based bioanode remained within a flow channel and 1 mM ethanol and $NAD^+$ was pumped through the system at 1.0 mL/min. The cathode was placed in the reservoir at the end of the flow channel as shown in FIG. 13. A representative power curve obtained for this biofuel cell is presented in FIG. 14. Maximum open circuit potentials of 0.34V have been obtained with maximum current densities of 53.0±9.1 $\mu A/cm^2$ for a microfluidic system employing alcohol dehydrogenase. These are significantly lower than the macroscale biofuel cell in part due to the thick membrane film on the electrode surface. In the macroscale system, control of the film thickness is obtained by pipetting a smaller or larger volume on the electrode. Microelectrodes are coated by flowing the casting solution through the channels. The thickness of the membrane is dependent on the size of the electrodes and the percent of the membrane that is present in the solution.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above methods and products without departing from the scope of the invention, it is intended that all matter contained in the above description and shown in the accompanying drawings shall be interpreted as illustrative and not in a limiting sense.

What is claimed is:

1. A biofuel cell for generating electricity using a fuel fluid comprising:
   a non-conducting substrate;
   a cathode supported by the substrate and capable of a reaction to reduce an oxidant in the presence of electrons to form water;
   an anode supported by the substrate and capable of a reaction to oxidize the fuel fluid;
   at least one of the anode and cathode including an enzyme for use in carrying out its respective reaction; and either
   (i) at least one of the anode and cathode being formed for flow of the fuel fluid and/or oxidant therewithin for use in producing an electrical current; or
   (ii) at least one of the anode and cathode comprising a width less than about 200 μm and at least one surface having an irregular, three dimensional topography capable of inducing convective flow of the fuel fluid and/or oxidant over said surface.

2. The biofuel cell of claim 1, wherein the anode comprises
   (a) an electron conductor;
   (b) an electron mediator, the reduced form of the electron mediator being capable of releasing electrons to the electron conductor;
   (c) at least one anode enzyme capable of reacting with the oxidized form of the electron mediator and the fuel fluid to produce an oxidized form of the fuel fluid and a reduced form of the electron mediator;
   (d) an enzyme immobilization material capable of immobilizing and stabilizing the enzyme, the material being permeable to the fuel fluid and the electron mediator, and optionally, the material comprises the electron mediator.

3. The biofuel cell of claim 2 wherein the anode's electron mediator comprises pyrroloquinoline quinone (PQQ), phenazine methosulfate, dichlorophenol, indophenol, short chain ubiquinones, or potassium ferricyanide.

4. The biofuel cell of claim 2 wherein the anode enzyme comprises an oxidoreductase that acts on the CH—OH group or CH—NH group, a dehydrogenase, alcohol dehydrogenase, aldehyde dehydrogenase, formate dehydrogenase, formaldehyde dehydrogenase, glucose dehydrogenase, glucose oxidase, lactic dehydrogenase, lactose dehydrogenase, pyruvate dehydrogenase, or a PQQ-dependent dehydrogenase.

5. The biofuel cell of claim 2 wherein the enzyme immobilization material immobilizing the anode enzyme comprises a micellar or inverted micellar structure.

6. The biofuel cell of claim 5 wherein the anode enzyme is entrapped within the enzyme immobilization material.

7. The biofuel cell of claim 1, wherein the anode comprises
   (a) an electron conductor;
   (b) an electron mediator;
   (c) at least one enzyme capable of reacting with the oxidized form of the electron mediator and the fuel fluid to produce an oxidized form of the fuel fluid and a reduced form of the electron mediator;
   (d) an enzyme immobilization material optionally comprising the electron mediator and/or an electrocatalyst, the material being capable of immobilizing and stabilizing the enzyme, the material being permeable to the fuel fluid; and
   (e) an electrocatalyst adjacent the electron conductor, an oxidized form of the electrocatalyst being capable of reacting with the reduced form of the electron mediator to produce an oxidized form of the electron mediator and a reduced form of the electrocatalyst, the reduced form of the electrocatalyst being capable of releasing electrons to the electron conductor.

8. The biofuel cell of claim 7 wherein the enzyme immobilization material immobilizing the anode enzyme comprises a micellar or inverted micellar structure.

9. The biofuel cell of claim 8 wherein the anode enzyme is entrapped within the enzyme immobilization material.

10. The biofuel cell of claim 1, wherein the cathode comprises
    (a) an electron conductor;
    (b) at least one enzyme capable of reacting with a reduced form of an electron mediator and an oxidant to produce an oxidized form of the electron mediator and water; and
    (c) an enzyme immobilization material comprising either the electron mediator, an electrocatalyst, or the electron mediator and an electrocatalyst, the enzyme immobilization material being capable of immobilizing and stabilizing the enzyme, the material being permeable to the oxidant, an oxidized form of the electrocatalyst being capable of gaining electrons from the electron conductor to produce a reduced form of the electrocatalyst that is capable of reacting with an oxidized form of the electron mediator to produce a reduced form of the electron mediator and an oxidized form of the electrocatalyst.

11. The biofuel cell of claim 10 wherein the enzyme comprises a laccase, an oxidase, a glucose oxidase, an alcohol-based oxidase, a cholesterol-based oxidase, an oxygen oxidoreductase, or a bilirubin oxidase.

12. The biofuel cell of claim 10 wherein the enzyme immobilization material immobilizing the cathode enzyme comprises a micellar or inverted micellar structure.

13. The biofuel cell of claim 12 wherein the cathode enzyme is entrapped within the enzyme immobilization material.

14. The biofuel cell of claim 1, wherein the cathode comprises
    (a) an electron conductor;
    (b) at least one enzyme capable of reacting with a reduced form of an electron mediator and an oxidant to produce an oxidized form of the electron mediator and water; and
    (c) an enzyme immobilization material optionally comprising the electron mediator, the enzyme immobilization material being capable of immobilizing and stabilizing the enzyme, the material being permeable to the oxidant, an oxidized form of the electron mediator being capable of gaining electrons from the electron conductor to produce a reduced form of the electron mediator.

15. The biofuel cell of claim 14 wherein the enzyme immobilization material immobilizing the cathode enzyme comprises a micellar or inverted micellar structure.

16. The biofuel cell of claim 15 wherein the cathode enzyme is entrapped within the enzyme immobilization material.

17. The biofuel cell of claim 1 wherein the anode and/or the cathode is formed for flow and the fuel fluid and/or the oxidant is moved through the biofuel cell at a flow rate of between about 0.01 μL/min and about 10 μL/min.

18. A method for forming an electrode for use in a biofuel cell, the method comprising
   forming at least one electrical connector on a substrate;
   forming at least one microchannel in a non-conductive casting mold comprised of a material that will not passivate the electrode and can be reversibly sealed to the substrate;
   adhering the casting mold to the substrate;
   flowing an electron conductor solution through the microchannels; and
   curing the electron conductor solution to form the electrode.

19. The method of claim 18, wherein the microchannels in the casting mold are formed using soft lithography.

20. The method of claim 18, wherein the substrate is flat.

21. The method of claim 18, wherein the method further comprises removing the casting mold and replacing it with a gas-permeable mold comprising larger microchannels.

22. The method of claim 21, wherein the microchannels in the gas-permeable mold are formed using soft lithography.

23. The method of claim 18, wherein the electron conductor solution comprises a carbon-based ink.

* * * * *